United States Patent
Beshai et al.

(10) Patent No.: US 6,907,002 B2
(45) Date of Patent: Jun. 14, 2005

(54) BURST SWITCHING IN A HIGH CAPACITY NETWORK

(75) Inventors: Maged E. Beshai, Stittsville (CA); Richard Vickers, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 863 days.

(21) Appl. No.: 09/750,071

(22) Filed: Dec. 29, 2000

(65) Prior Publication Data

US 2002/0085491 A1 Jul. 4, 2002

(51) Int. Cl.$^7$ .............................. H04L 1/00; H04L 12/50
(52) U.S. Cl. ....................... 370/230; 370/232; 370/235; 370/358; 370/360; 370/381
(58) Field of Search .......................... 370/235.1, 236.1, 370/236.2, 230, 231, 232, 233, 234, 235, 236, 237, 238, 239, 240, 380, 357, 358, 360, 381, 389, 230.1

(56) References Cited

U.S. PATENT DOCUMENTS

| | | | | |
|---|---|---|---|---|
| 5,107,489 A | * | 4/1992 | Brown et al. ................ | 370/360 |
| 5,231,631 A | * | 7/1993 | Buhrke et al. .............. | 370/230 |
| 5,241,536 A | | 8/1993 | Grimble et al. ............ | 370/60.1 |
| 5,572,678 A | * | 11/1996 | Homma et al. ............. | 709/227 |
| 5,634,006 A | * | 5/1997 | Baugher et al. ............ | 709/228 |
| 5,636,212 A | * | 6/1997 | Ikeda ........................ | 370/233 |
| 5,668,951 A | * | 9/1997 | Jain et al. .................. | 709/235 |
| 5,745,486 A | | 4/1998 | Beshai et al. .............. | 370/352 |
| 5,953,318 A | * | 9/1999 | Nattkemper et al. ........ | 370/236 |
| 6,091,740 A | * | 7/2000 | Karasawa .................... | 370/458 |
| 6,118,762 A | * | 9/2000 | Nomura et al. ............. | 370/230 |
| 6,185,186 B1 | * | 2/2001 | Watanabe ................... | 370/232 |
| 6,317,415 B1 | * | 11/2001 | Darnell et al. .............. | 370/230 |
| 6,405,257 B1 | * | 6/2002 | Gersht et al. ............... | 709/235 |
| 6,560,196 B1 | * | 5/2003 | Wei .......................... | 370/230.1 |

FOREIGN PATENT DOCUMENTS

WO    WO 00/13093    3/2000

OTHER PUBLICATIONS

Amstutz, S.R., "Burst Switching—An Update", IEEE Communications Magazine, Sep. 1989, p. 50–57.

Qiao, C., "Optical Networking Solutions for Next–Generation Internet Networks —Labled Optical Burst Switching for IP–over–WDM Integration", IEEE Communicaitons Magazine, Sep. 2000, p 104–114.

Turner, J.S., "Terabit Burst Switching", Journal of High Speed Networks, 1999, p 1–18.

(Continued)

*Primary Examiner*—Phirin Sam
*Assistant Examiner*—Anthony Ton

(57) ABSTRACT

At a master controller of a space switch in a node in a data network, a request is received from a source node that requests a connection to be established through the space switch. This request is compared to other such requests so that a schedule may be established for access to the space switch. The schedule is then sent to the source nodes as well as to a slave controller of the space switch. The source nodes send data bursts which are received at the space switch during a short guard time between successive reconfigurations of the space switch. Data bursts are received at the space switch at a precisely determined instant of time that ensures that the space switch has already reconfigured to provide requested paths for the individual bursts. The scheduling is pipelined and performed in a manner that attempts to reduce mismatch intervals of the occupancy states of input and output ports of the space switch. The method thus allows efficient utilization of the data network resources while ensuring virtually no data loss.

27 Claims, 23 Drawing Sheets

OTHER PUBLICATIONS

Danielsen S. L. et al.: "Analysis of a WDM Packet Switch with Improved Performance under Bursty Traffic Conditions due to Tuneable Wavelength Converters", Journal of Lightwave Technology, IEEE., vol. 16, No. 5, May 1, 1998, pp. 729–735, XP000772635, New York, U.S.A., ISSN 0733–8724.

Xiong Y. et al.: "Control Architecture in Optical Burst–Switched WDM Networks" IEEE Journal on Selected Areas in Communications, vol. 18, No. 10, Oct. 2000, pp. 1838–1851, XP000976892 New York, U.S.A., ISSN 0733–8716.

* cited by examiner

BURST SWITCHING IN A HIGH CAPACITY NETWORK

GOVERNMENT LICENSE RIGHTS

This invention was made with Government support under Technology Investment Agreement F30602-98-2-0194 awarded by the Air Force. The Government has certain rights in the invention.

FIELD OF THE INVENTION

The present invention relates to data communication networks and, in particular, to burst switching in a high capacity network.

BACKGROUND OF THE INVENTION

In burst switching, a source node sends a burst transfer request to a core node to indicate that a burst of data is coming, the size of the burst and the destination of the burst. Responsive to this burst transfer request, the core node configures a space switch to connect a link on which the burst will be received to a link to the requested burst destination. In a first scheme, the burst follows the burst transfer request after a predetermined time period (a scheduling time) and it is expected that, when the burst arrives at the core node, the space switch will have been properly configured by the core node. In a second scheme, the source node waits for a message from the core node, where the message acknowledges that the space switch in the core node is properly configured, before sending the burst.

Often core nodes are used that do not have buffers to buffer incoming data. Core nodes without buffers are desirable because: it may not be possible to provide buffers without an expensive optical-electrical conversion at input and electrical-optical conversion at output of an optical space switch; and the core node may be distant from the source and sink (edge) nodes, therefore requiring remote buffer management in an edge-controlled network.

In the first scheme, a burst may arrive at a core node before the space switch is properly configured and, if the core node does not include a buffer, the burst may be lost. Furthermore, until the source node fails to receive an acknowledgement of receipt of the burst from the burst destination, the fact that the burst has been lost at the core node is unknown to the source node. Having not received acknowledgement of receipt of the burst, the source node may then retransmit the burst. In the second scheme, the time delay involved in sending a burst transfer request and receiving an acceptance before sending a burst may be unacceptably high, leading to low network utilization. Despite these shortcomings, burst switching is gaining popularity as a technique to transfer data in high-speed networks since it simplifies many of the control functions and does not require capacity to be reserved when it may not always be in use. Furthermore, burst switching reduces a need for characterizing the traffic. Clearly, a burst switching technique that allows for greater network utilization is desirable.

SUMMARY OF THE INVENTION

At a controller of a space switch, a novel burst scheduling technique allows efficient utilization of network resources. Burst transfer requests are received at the space switch controller and pipelined such that the controller may determine a schedule for allowing the bursts, represented by the burst transfer requests, access to the space switch. According to the schedule, scheduling information is distributed to the sources of the burst transfer requests and to a controller of the space switch.

Advantageously, the novel burst scheduling technique allows for utilization of network resources that is more efficient than typical burst switching techniques, especially when the novel burst scheduling technique is used in combination with known time locking methods. The novel burst scheduling technique enables the application of burst switching to wide coverage networks. Instead of handling burst requests one-by-one, burst requests are pipelined and the handling of the bursts is scheduled over a long future period.

In accordance with an aspect of the present invention there is provided a method of controlling a space switch to establish time-varying connections, the method includes receiving a stream of burst transfer requests from a source node, each of the burst transfer requests including parameters specifying a requested connection and a duration for the requested connection, generating scheduling information for each of the burst transfer requests based on the parameters, transmitting the scheduling information to the source node and transmitting instructions to a slave controller for the space switch, where the instructions are based on the scheduling information and instruct the space switch to establish the requested connection. In another aspect of the invention a space switch master controller is provided for performing this method. In a further aspect of the present invention, there is provided a software medium that permits a general purpose computer to carry out this method.

In accordance with another aspect of the present invention there is provided a method of generating scheduling information. The method includes determining a next-available input port among a plurality of input ports and a time index at which the next-available input port will become available and, for each burst transfer request of a plurality of burst transfer requests received in relation to the next-available input port, and where each the each burst transfer request includes an identity of a burst and a destination for the burst; determining, from the destination for the burst, a corresponding output port among a plurality of output ports; determining a time gap, where the time gap is a difference between: the time index at which the next-available input port will become available; and a time index at which the corresponding output port will become available. The method further includes selecting one of the plurality of burst transfer requests as a selected burst transfer request, where the selected burst transfer request has a minimum time gap of the plurality of burst transfer requests, selecting a scheduled time index, where the scheduled time index is one of the time index at which the next-available input port is available and the time index at which the corresponding output port is available and transmitting scheduling information for a burst identified by the selected burst transfer request, the scheduling information based on the scheduled time index. In another aspect of the invention a burst scheduler is provided for performing this method. In a further aspect of the present invention, there is provided a software medium that permits a general purpose computer to carry out this method.

In accordance with a further aspect of the present invention there is provided a core node in a data network. The core node includes a space switch, a plurality of input ports, a plurality of output ports and a slave controller for the space switch for receiving instructions from a master controller of the space switch, the instructions including specifications of temporary connections to establish between the plurality of input ports and the plurality of output ports and indications of timing with which to establish the connections.

In accordance with a still further aspect of the present invention there is provided a data network including a plurality of edge nodes, a plurality of core nodes, each core node of the plurality of core nodes including a space switch and a master controller for one the space switch in one the core node for: receiving a stream of burst transfer requests from one of the plurality of edge nodes, each of the burst transfer requests including parameters specifying a requested connection and a duration for the requested connection; generating scheduling information for each of the burst transfer requests based on the parameters; transmitting the scheduling information to the one of the plurality of edge nodes; and transmitting the instructions to a slave controller for the one the space switch, where the instructions are based on the scheduling information.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
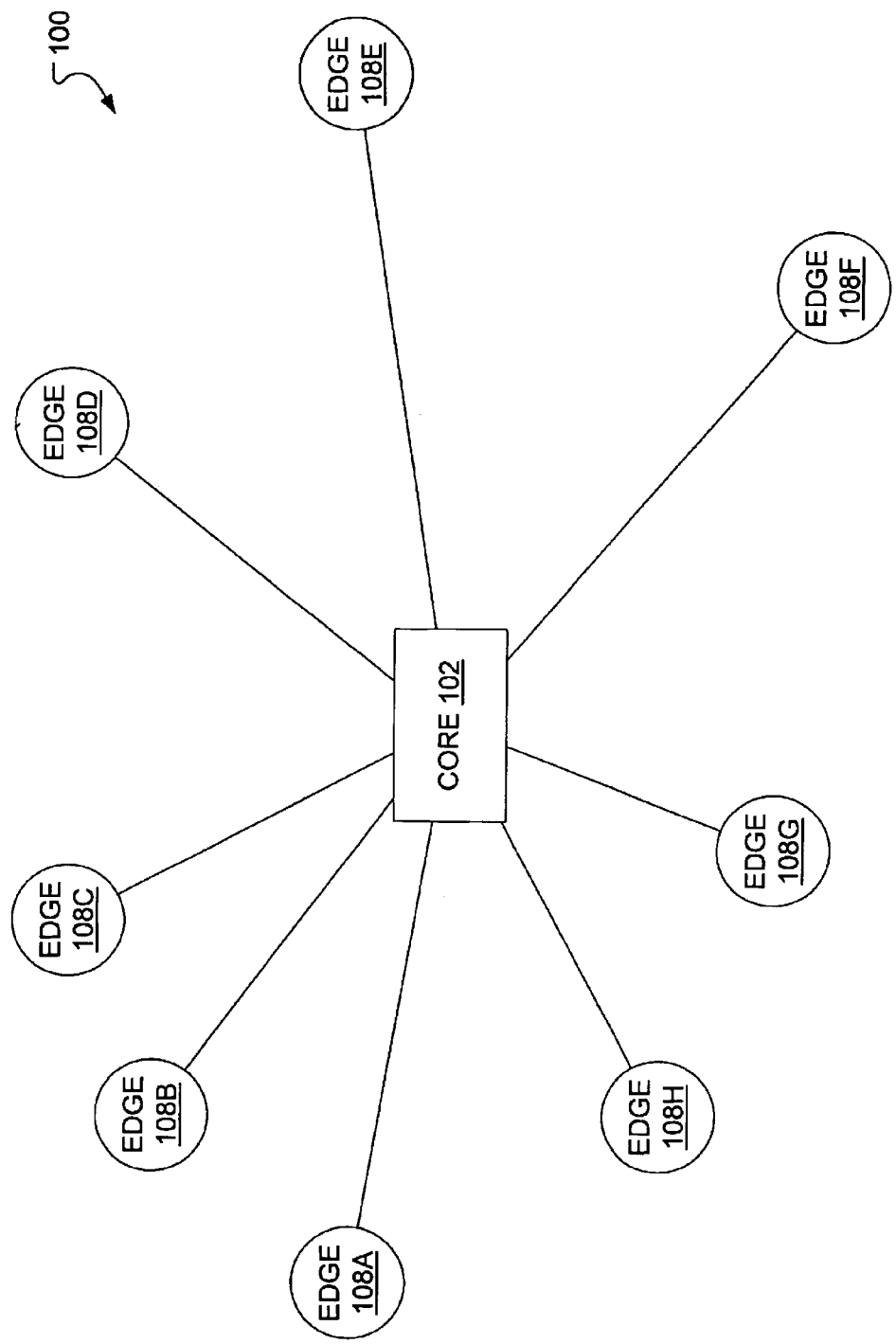
FIG. 1 schematically illustrates a hub and spoke network including a core node that may employ embodiments of the present invention.

FIG. 1 illustrates a rudimentary "hub and spoke" data network 100 wherein a number of edge nodes 108A, 108B, 108C, 108D, 108E, 108F, 108G, 108H (referred to individually or collectively as 108) connect to each other via a core node 102. An edge node 108 includes a source node that supports traffic sources and a sink node that supports traffic sinks. Traffic sources and traffic sinks (not shown) are usually paired and each source node is usually integrated with a sink node with which it shares memory and control.

Figure 2:
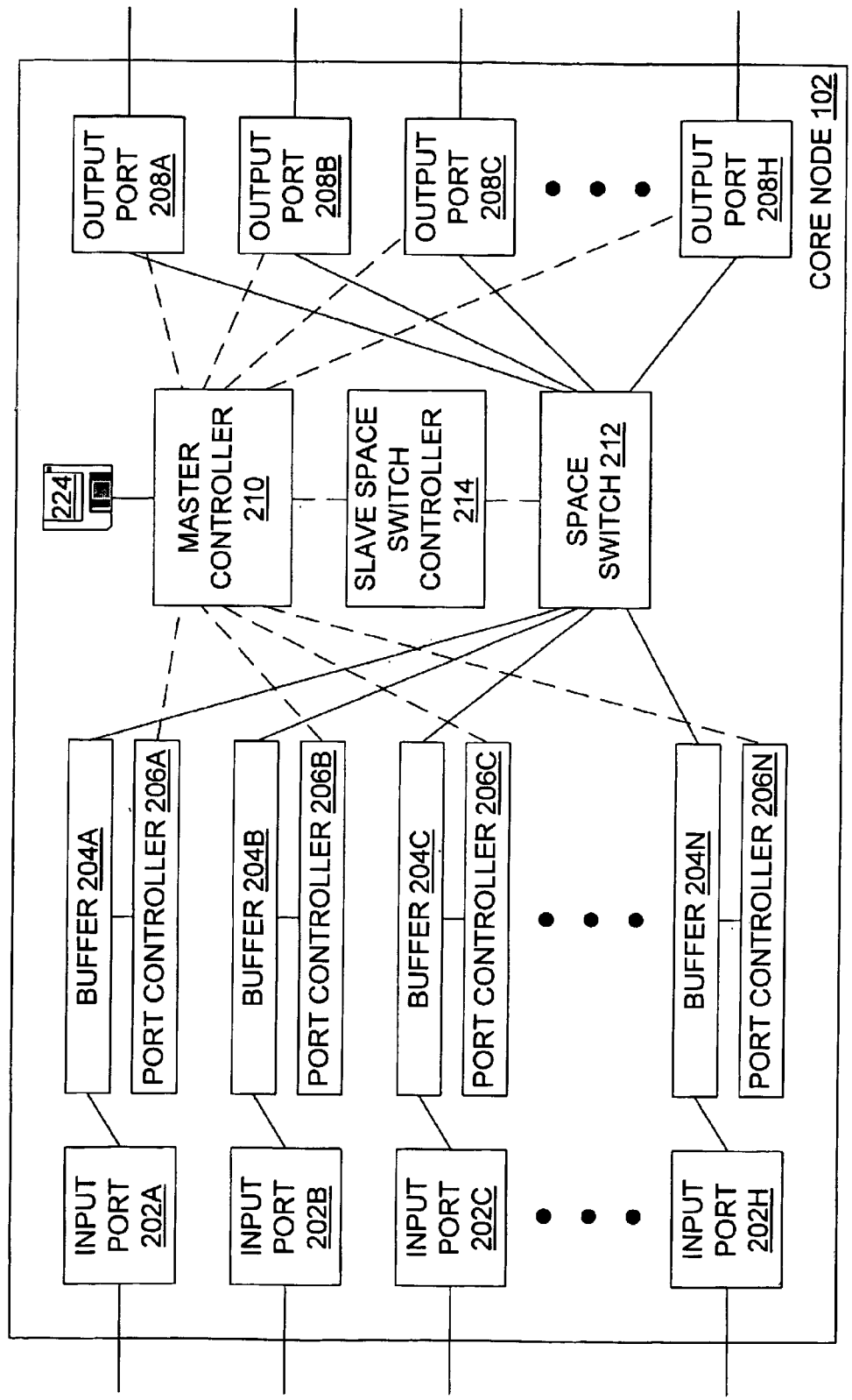
FIG. 2 illustrates the core node of FIG. 1.

The core node 102 may be considered in greater detail in view of FIG. 2, which illustrates an electronic core node. The core node 102 includes N input ports 202A, 202B, 202C, . . . , 202N (referred to individually or collectively as 202) for receiving data from the edge nodes 108 of FIG. 1. Each of the N input ports 202 is connected to a corresponding buffer 204A, 204B, 204C, . . . , 204N (referred to individually or collectively as 204) that is connected to a corresponding port controller 206A, 206B, 206C, . . . , 206N (referred to individually or collectively as 206). A space switch 212 directs input received from each of the buffers 204 to an appropriate one of M output ports 208A, 208B, 208C, . . . , 208M (referred to individually or collectively as 208) under control of a slave space switch controller 214. Notably, although the core node 102 and the space switch 212 are described as having a number of inputs, N, that is different from the number, M, of outputs, quite often the number of inputs and outputs is equal, i.e., N=M. A master controller 210 is communicatively coupled to the port controllers 206 and the output ports 208 as well as to the slave space switch controller 214. Each of the control functions of the master controller 210 can be implemented in application-specific hardware, which is the preferred implementation when high speed is a requirement. In an alternative implementation the master controller 210 may be loaded with burst scheduling and time locking software for executing methods exemplary of this invention from a software medium 224 which could be a disk, a tape, a chip or a random access memory containing a file downloaded from a remote source.

Figure 3:
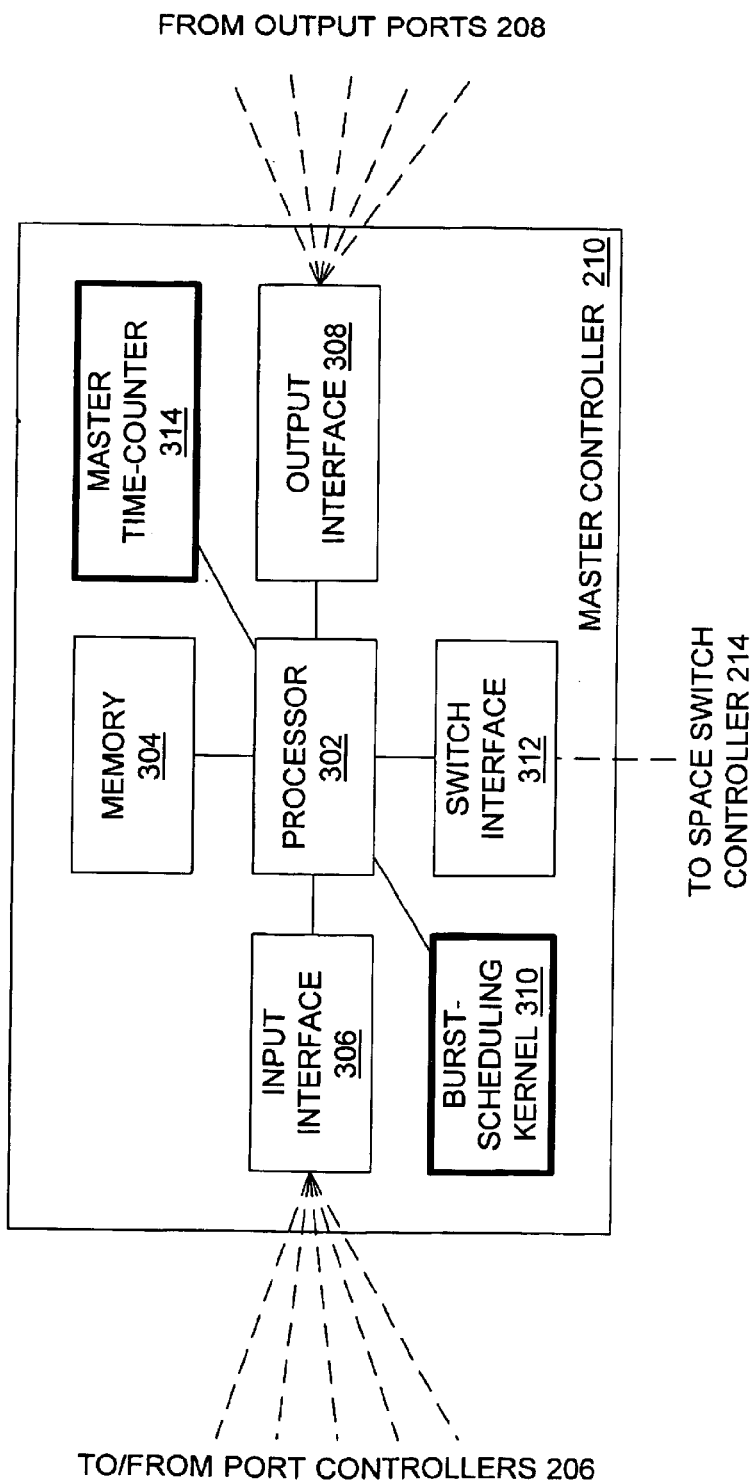
FIG. 3 illustrates a master controller for use in the core node of FIG. 2.

As illustrated in detail in FIG. 3, the master controller 210 includes a processor 302. The processor 302 maintains connections to a memory 304, an input interface 306, an output interface 308, a switch interface 312 and a master time counter 314. At the input interface 306, the master controller 210 receives burst transfer requests from the port controllers 206. At the output interface, the master controller 210 may communicate with the output ports 208 to perform conventional operational and maintenance functions. This processor 302 is also connected to a burst-scheduling kernel 310. Based on the burst transfer requests received from the processor 302, the burst-scheduling kernel 310 determines appropriate timing for switching at the space switch 212. According to the determined timing received from the burst-scheduling kernel 310, the processor 302 passes scheduling information to the slave space switch controller 214 via the switch interface 312. The processor 302 also controls the timing of transmission of bursts, from the buffers 204 to the space switch 212, by transmitting scheduling information to the port controllers 206 via the input interface 306.

Figure 4:
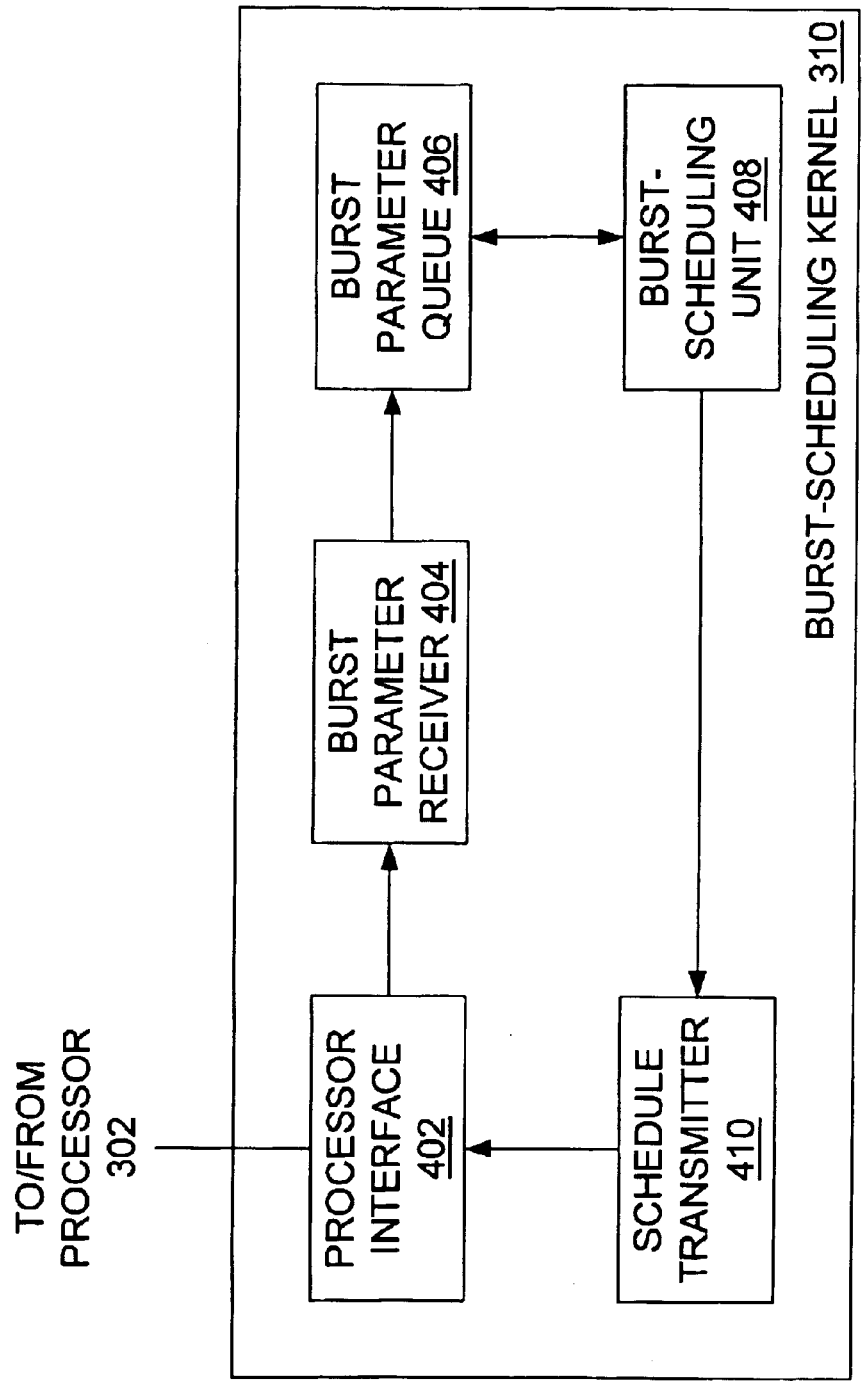
FIG. 4 illustrates a burst scheduler for use in the space switch controller of FIG. 3.

The burst-scheduling kernel 310 may now be described in view of FIG. 4. The burst-scheduling kernel 310 receives burst transfer requests from the processor 302 via a processor interface 402 and a burst parameter receiver 404. The burst parameter receiver 404 may, for instance, be implemented as a time slotted bus. The parameters of these bursts are queued at a burst parameter queue 406 before being accessed by a burst-scheduling unit 408. Included in the burst-scheduling unit 408 may be a time-space map and a space-time map as well as comparators and selectors for generating scheduling information (co-ordination between these maps). The maps are implemented in partitioned random-access memories. After generating scheduling information for a burst, the scheduling information is transferred to the processor 302 via a schedule transmitter 410 and the processor interface 402.

In overview, an input port 202A of core node 102 receives a burst from a subtending edge node 108. The burst is stored in the buffer 204A. Parameters indicating the size (e.g., is two megabits) and destination (e.g., a particular edge node 108B) of the burst are communicated from the port controller 206A to the master controller 210 as a burst transfer request. The burst-scheduling unit 408 of the master controller 210 (executes a burst scheduling algorithm to generate scheduling information and communicates relevant parts of the generated scheduling information to the port controllers 206. That master controller 210 also communicates relevant parts of the generated scheduling information to the slave space switch controller 214. According to the scheduling information received at the port controller 206A, the buffer 204A sends bursts to the space switch 212. At the space switch 212, a connection is established between the buffer 204A and the output port 208B, according to instructions received from the slave space switch controller 214, such that the burst is successfully transferred from an edge node 108 associated with the traffic source to the edge node 108 associated with the traffic sink.

Figure 5A:
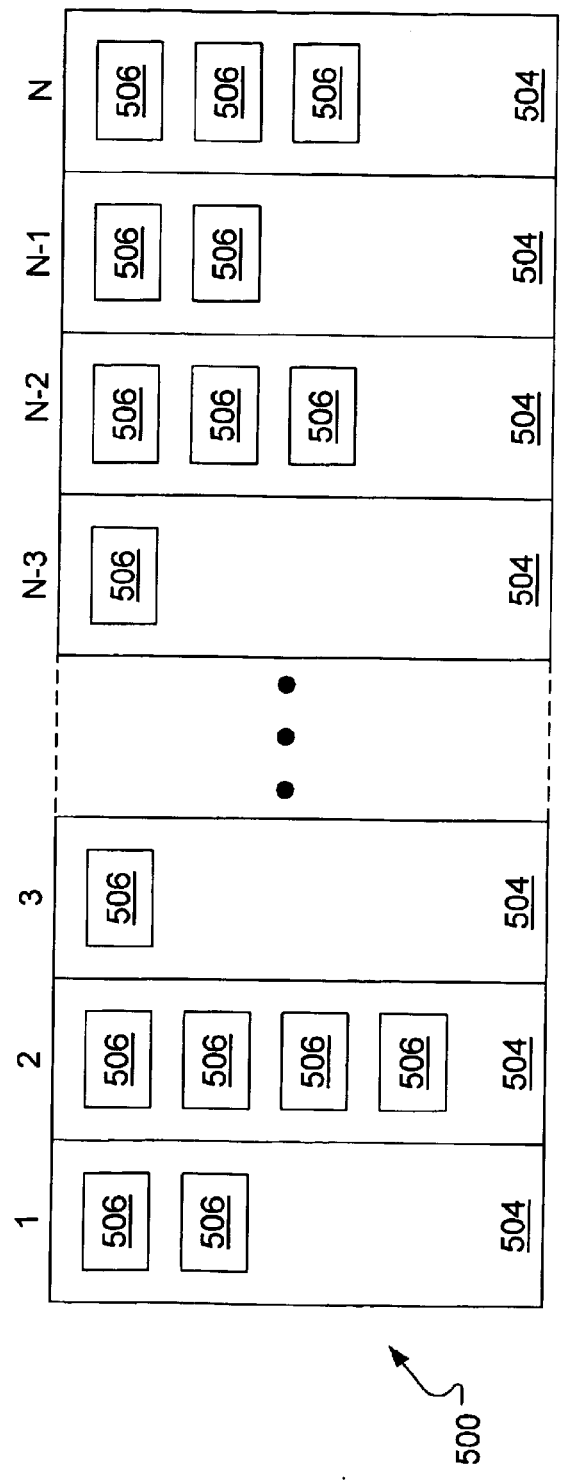
FIG. 5A illustrates a data structure for use in an embodiment of the present invention.
Figure 5B:
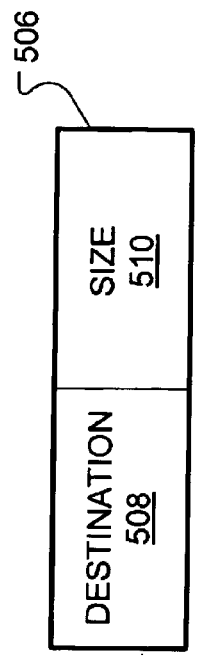
FIG. 5B illustrates an entry in the data structure of FIG. 5A.

At the master controller 210 (see FIG. 3), the burst transfer request is received by the input interface 306 and passed to the processor 302. The processor 302 then sends the burst transfer request to the burst-scheduling kernel 310. At the burst-scheduling kernel 310 in FIG. 4, the burst transfer request is received at the processor interface 402 and the included burst parameters are extracted at the burst parameter receiver 404. The parameters are queued at the burst parameter queue 406 and subsequently stored at the burst-scheduling unit 408 in a data structure 500 (FIG. 5A). The parameters are stored as an entry 506 in a record 504, where the entry 506 is associated with the burst described by the received parameters. Each record 504 has a plurality of entries 506, and each entry 506 is associated with a burst waiting in a buffer 204. As the number of bursts waiting in each buffer 204 may be different, the records 504 may be of varying sizes. As well, the plurality of entries 506 in each record 504 may be a linked list as will be described hereinafter. Furthermore, the data structure 500 is made up of N records 504, where each record 504 corresponds to one of the N input ports 202 (FIG. 2). As illustrated in FIG. 5B, each entry 506 includes a destination field 508 for storing the destination parameter of the burst and a size field 510 for storing the transfer-time (size) parameter of the burst.

A generic memory device storing an array that has a time-varying number of data units must have a sufficient capacity to store the expected maximum number of data units. If several arrays, each having a time-varying number of data units, share the generic memory device, then the allocation of the expected maximum number of data units for each array may be considered wasteful. The data structure 500 stores entries 506 containing parameters of burst transfer requests received from each of the input ports 202. The number of entries 506 for any particular input port 202 may vary violently with time, i.e., number of entries 506 for the particular input port 202 may have a high coefficient of variation. However, the total number of entries 506 waiting in the data structure 500 and corresponding to the N input ports 202 would have a much smaller coefficient of variation when N is large, as would be expected in this case. The size of memory required for the data structure 500 can then be significantly reduced if the entries 506 are stored as N interleaved linked lists. Interleaved linked lists are well known in the art and are not described here. Essentially, interleaved linked lists allow dynamic sharing of a memory by X (where X>1) data groupings using X insertion pointers and X removal pointers. Thus, the interleaved linked lists are addressed independently but they share the same memory device.

The number, X, of data groupings in the data structure 500 is at least equal to the number of input ports, N, though X may be higher than N if traffic classes are introduced. X may also be higher than N if data from a source node to a sink node uses multiple paths through different core nodes (as will be described hereinafter), since the data of each path must be identified. Thus, the use of an interleaved linked list is preferred to the use of a memory structured to provide a fixed memory partition per traffic stream. A traffic stream is an aggregation of traffic from a particular source edge node 108 to a particular destination edge node 108, often resulting in a succession of bursts.

Figure 6:
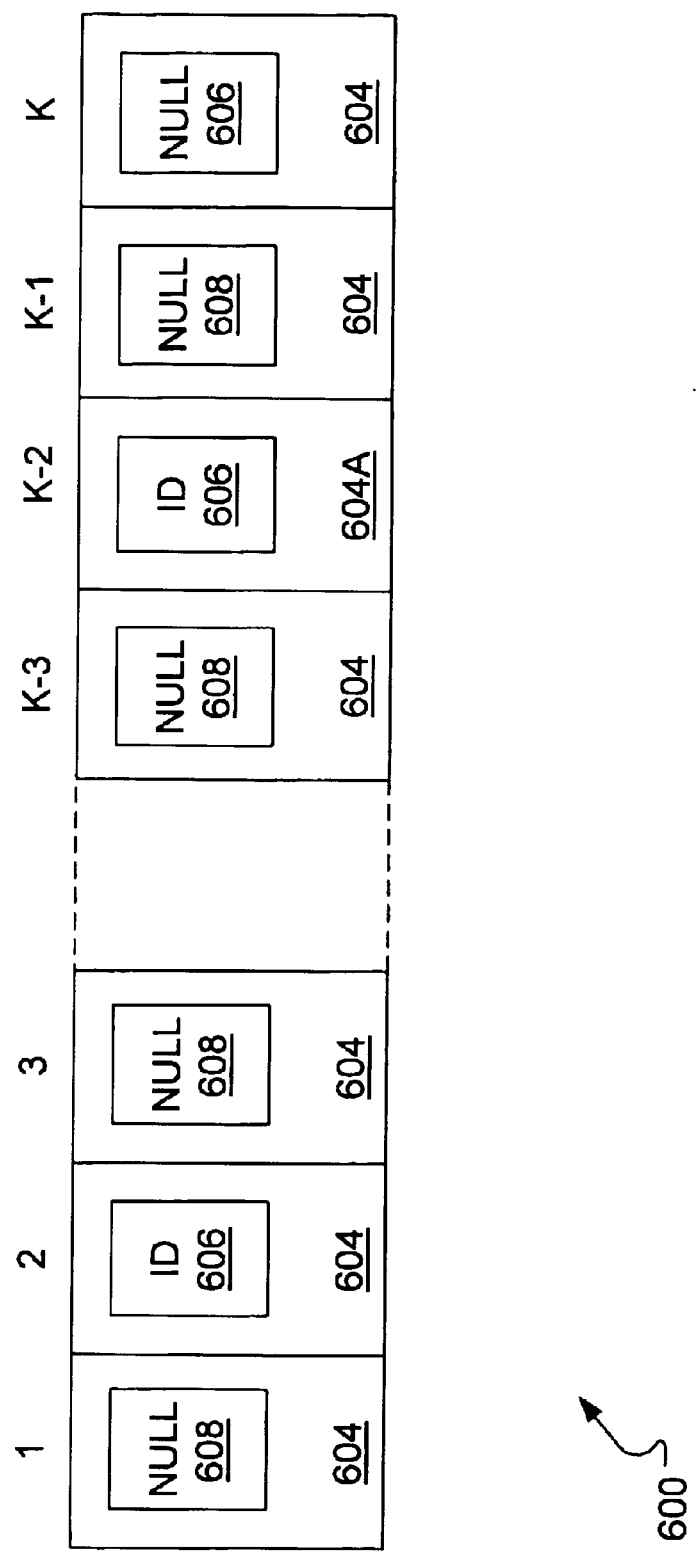
FIG. 6 illustrates a time-space map for use in an embodiment of the present invention.
Figure 7:
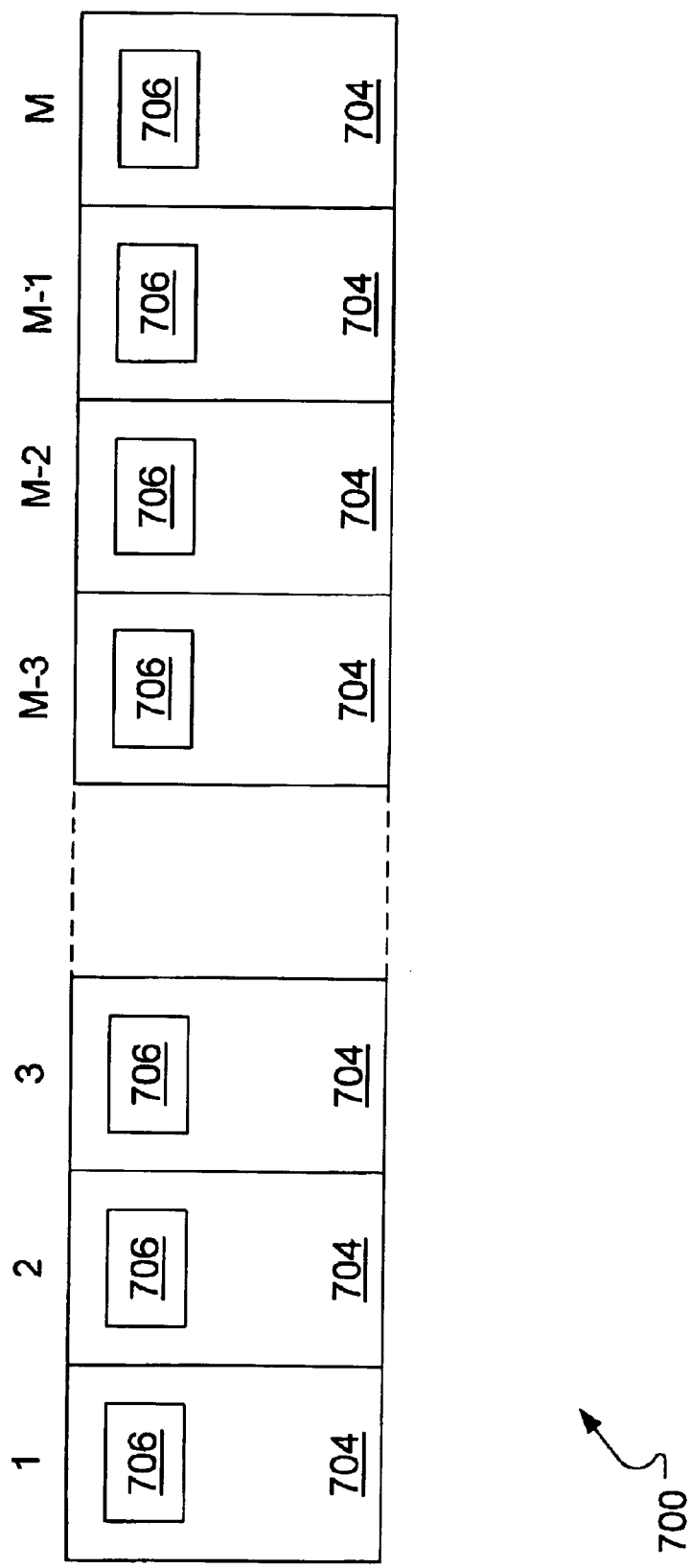
FIG. 7 illustrates an M-entry Map for use in an embodiment of the present invention.

The burst-scheduling unit 408 maintains two other data structures, namely a calendar (i.e., a time-space map) 600 (see FIG. 6) and an M-element array (i.e., a space-time map) 700 (see FIG. 7).

The calendar 600 is divided into K time slots 604; indexed from 1 to K. Some of the time slots 604 in the calendar 600 contain identifiers 606 of input ports 202. Those time slots 604 that do not contain input port identifiers 606 contain, instead, null identifiers 608. Each time slot 604 contains either an input port identifier 606 or a null identifier 608. The presence, in a given time slot 604, of a particular input port identifier 606 indicates to the master controller 210 that an input port 202 (an identifier of which is contained in a particular input port identifier 606) is available to transmit data (if it has waiting data) to the space switch 212 from the time corresponding to the given time slot 604 forward. Each of the time slots 604 in the calendar 600 is representative of a short time period, say 100 nanoseconds.

Thus, the instant of time at which a given input port 202 is determined to be available is represented by a time slot 604 in the calendar 600. This will typically force a rounding up of the actual availability time to a nearest time slot 604. The duration of a time slot 604 in the calendar 600, therefore, should be small enough to permit an accurate representation of time and should be large enough to reduce the mean number of times a memory holding the calendar 600 has to be accessed before finding an indication of an input port 202. Several time slots 604 in the calendar 600 contain null identifiers 608 (i.e., all the time slots 604 that don not contain an input port identifier 606) and these must be read since the calendar 600 must be read sequentially. The memory holding the calendar 600 must be a random-access memory however, since an address (index) at which an input port identifier 606 is written is arbitrary.

Preferably, the number, K, of time slots 604 in the calendar 600, is significantly larger than the number of input ports 202, N (each port of the space switch 212 has an entry in the calendar, even if the port is not active for an extended period of time). In general, K must be greater than N, where N time slots 604 contain input port identifiers 606 and (K-N) time slots 604 contain null identifiers 608. Further, the duration of the calendar 600 must be larger than a maximum burst span. With a specified maximum burst span of 10 milliseconds, for example, an acceptable number (K) of time slots 604 in the calendar 600 is 250,000 with a slot time of 64 nanoseconds.

There is a requirement that the calendar 600 be time locked to the master time counter 314 as will be described hereinafter. In one embodiment of the present invention, each time slot 604 in the calendar 600 has a duration equivalent to a single tick of the master time counter 314. In other embodiments, each time slot 604 in the calendar 600 has a duration equivalent to an integer multiple of the duration of a single tick of the master time counter 314. Each port controller 206 has an awareness of time at the master time counter 314, so that scheduling information received at the port controller 206 may be used to send a burst to the space switch 212 at the time indicated by scheduling information. This awareness may be derived from access to a clock bus or through a time locked local counter.

In order to speed up the process, the calendar 600 may be implemented in multiple memory devices. For example, a calendar of 262,144 ($2^{18}$) time slots 604, can be implemented in 16 memory devices each having a capacity to store of 16,384 time slots 604. Addressing a time slot 604 in a multiple-memory calendar is known in the art.

In the M-element array 700, each element 704 corresponds to one of the output ports 208. Each element 704 in the M-element array 700 holds a state-transition-time indicator 706. The state-transition-time indicator 706 is an index of a time slot 604 in the calendar 600 representative of a point in time at which the respective output port 208 will be available to transmit data. If, for instance, the calendar 600 has sixteen thousand time slots 604 (i.e., K=16,000), each element 704 in the M-element array 700 may be two bytes long (i.e., capable of holding a binary representation of a time slot index as high as 65,536). Where each of the time slots 604 is 100 nanoseconds long, a sixteen thousand slot calendar 600 may accommodate bursts having a length up to 1.6 milliseconds (i.e., 16 megabits at ten gigabits per second) without having to wrap around the current time where writing the availability of the input port 202 to the calendar 600.

To examine scheduling in detail, we may first assume that the master controller 210 has already been operating, that is, assume that burst transfer requests have been satisfied and bursts are therefore flowing from the input ports 202 to the output ports 208 of the core node 102.

The burst-scheduling unit 408 scans the calendar 600 to detect a future time slot 604 containing an input port identifier 606 (step 802), resulting in a detected time slot 604A. The burst-scheduling unit 408 then communicates with the burst parameter queue 406 to acquire entries 506 (step 804) from the record 504, in the data structure 500 (FIG. 5), that corresponds to the input port 202 identified in the input port identifier 606 in the detected time slot 604A. It is then determined whether there are entries 506 in the record 504 that corresponds to the identified input port 202 (step 805). Each of the entries 506 identify a destination and, from the destination, the burst-scheduling unit 408 may deduce an output port 208. If there are entries to schedule (i.e., waiting burst requests), the burst-scheduling unit 408 extracts a state-transition-time indicator 706 (step 806) from each element 704, in the M-element array 700 (FIG. 7), that corresponds to an output port 208 deduced from destinations identified by the acquired entries 506. The burst-scheduling unit 408 then determines a "gap" (step 808) by subtracting the index of the detected time slot 604A from the index of the time slot found in each state-transition-time indicator 706. Each gap represents a time difference between a time at which the input port 202 is available and a time at which the respective output port 208, requested in the respective burst transfer request, is available. The burst-scheduling unit 408 does this for each of the acquired entries 506 for the input port 202. Each entry 506 identifies a single burst transfer request. The burst-scheduling unit 408 then selects the burst transfer request corresponding to the minimum gap (step 810). As will be mentioned hereinafter, to simplify circuitry the step of acquiring entries 506 from the record 504 (step 804) may only require acquisition of a limited number of entries 506.

If the gap of the selected burst transfer request is positive, then the input port 202 is available before the output port 208. The time slot index identified in the state-transition-time indicator 706 corresponding to the availability of the output port 208 which was requested for the selected burst transfer request is then designated as a "scheduled time slot." If the gap of the selected burst transfer request is negative, then the input port 202 is available after the output port 208. The time slot index in which the input port identifier 606 was detected in step 802 (corresponding to the time when the input port 202 is available) is then designated as the scheduled time slot. The burst-scheduling unit 408 then transmits scheduling information (index of the scheduled time slot and identity of the burst transfer request) to the processor 302 (step 812) via the schedule transmitter 410 and the processor interface 402. When determining a minimum gap in step 810, a negative gap is preferred to a positive gap because use of the input port 202 may begin at the time corresponding to the detected time slot 604A, as the negative gap indicates that the requested output port 208 is already available.

Figure 9:
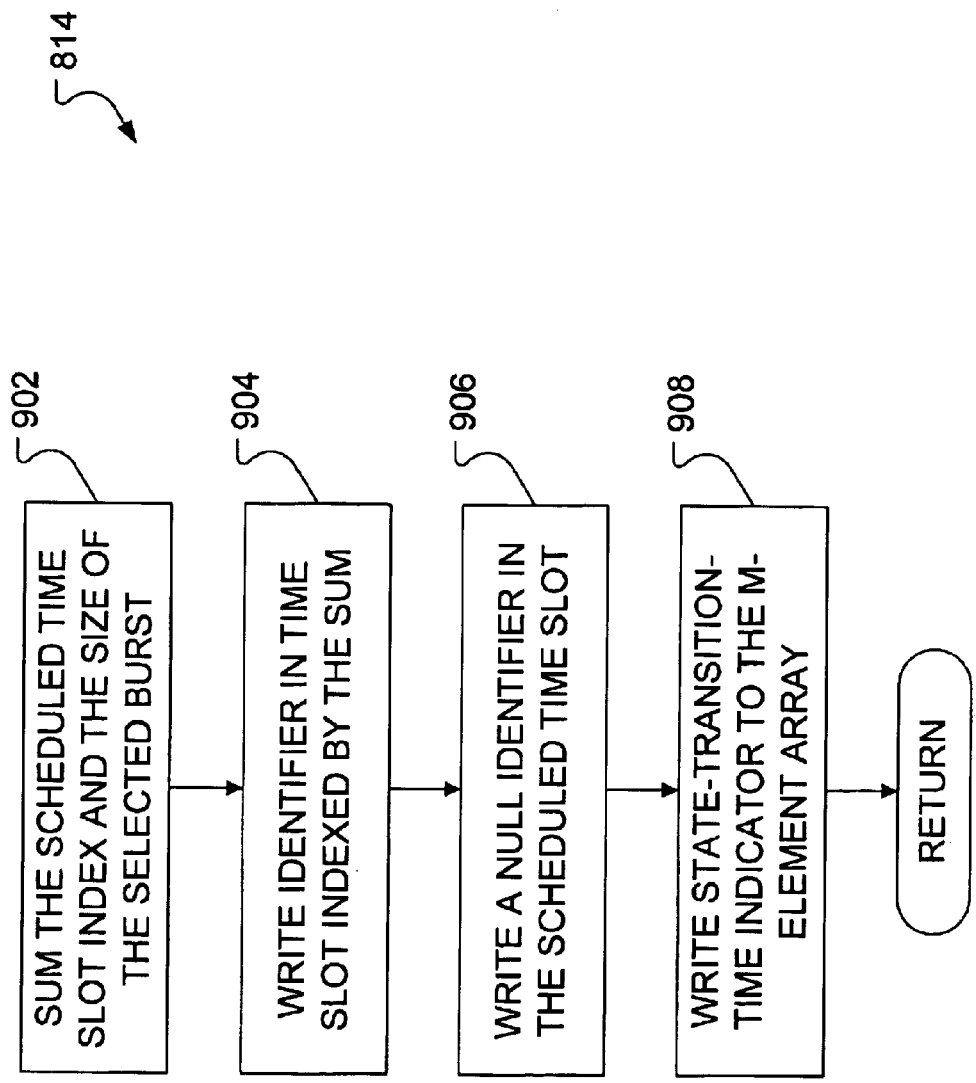
FIG. 9 illustrates steps of a map maintenance method for use in an embodiment of the present invention.

The burst-scheduling unit 408 then updates the calendar 600 and the M-element array 700 (step 814). FIG. 9 illustrates steps of the update method of step 814. The burst-scheduling unit 408 first sums the index of the scheduled time slot and the transfer-time determined from the size field 510 of the selected burst transfer request (step 902) and writes the input port identifier 606 of the selected burst transfer request in the time slot 604 indexed by the sum (step 904). The writing of the input port identifier 606 effectively identifies, to the burst-scheduling unit 408, the time at which the input port 202 will be available after transferring the burst corresponding to the selected burst transfer request. Notably, only one input port identifier 606 may occupy a single time slot 604. Consequently, if another input port identifier 606 is already present in the time slot 604 indexed by the sum, the burst-scheduling unit 408 will write to the next available time slot 604. After writing the input port identifier 606 to the time slot 604 indexed by the sum, the burst-scheduling unit 408 writes a null identifier 608 in the scheduled time slot (step 906).

Subsequently, or concurrently, the burst-scheduling unit 408 writes a state-transition-time indicator 706 to the M-element array 700 (step 908) in the element 704 corresponding to the output port 208 of the selected burst transfer request. The state-transition-time indicator 706 is an index of the time slot 604 indexed by the sun determined in step 902. As will be apparent to a person skilled in the art, pipelining techniques may also be used to reduce processing time.

If, as determined in step 805, there are no entries to schedule (i.e., waiting burst requests), the burst-scheduling unit 408 generates an artificial burst (step 816) where the size of the artificial burst is the "size of the selected burst" as far as step 902 is concerned. The result of this generation of an artificial burst is that (in step 814) the input port identifier 606 is written to a deferred time slot 604.

The processor 302, having received the scheduling information, transmits to the appropriate port controller 206, via the input interface 306, scheduling information to indicate a time at which to begin sending the burst corresponding to the selected burst transfer request to the space switch 212. The processor 302 also sends scheduling information (input-output configuration instructions) to the slave space switch controller 214 via the switch interface 312.

As the above assumes that the master controller 210 has already been operating, it is worth considering initial conditions, for the calendar 600 especially. As all of the input ports 202 are available initially, yet only one input port identifier 606 may occupy each time slot 604, the first N time slots 604 may be occupied by the input port identifiers 606 that identify each of the N input ports 202. Initially, the data structure 500 is clear of burst transfer requests and the state-transition-time indicator 706 present in each element 704 of the M-element array 700 may be an index of the first time slot 604 in the calendar 600.

When an input port 202 is determined to be available, i.e., when the input port identifier 606 is read from a detected time slot 604A (step 802), the corresponding record 504 in the data structure 500 is accessed to acquire entries 506. If the corresponding record 504 is found to be empty, the burst-scheduling unit 408 writes a null identifier 608 in the detected time slot 604A and writes the input port identifier 606 at a deferred time slot. The deferred time slot may be separated from the detected time slot 604A by, for example, 128 time slots. At 100 nanoseconds per time slot 604, this would be amount to a delay of about 13 microseconds.

If the M-element array 700 (FIG. 7) can only respond to a single read request at a time, the requests to read each state-transition-time indicator 706 from the elements 704 will be processed one after the other. To conserve time then, it may be desirable to maintain multiple identical copies of the M-element array 700. Where multiple copies are maintained, extraction of a state-transition-time indicator 706 from elements 704 in step 806 may be performed simultaneously. It is preferable that the writing of a particular state-transition-time indicator 706 to a given element 704 of each copy of the M-element array 700 (step 908) be performed in a parallel manner.

Where maintaining multiple identical copies of the M-element array 700 conserves time, this is done at the cost of memory. Thus, the number of entries 506 acquired in step 804 should be limited to a value, J. If J entries 506 are acquired in step 804, then there is only a requirement for J identical copies of the M-element array 700. It is preferred that J not exceed four.

Figure 10:
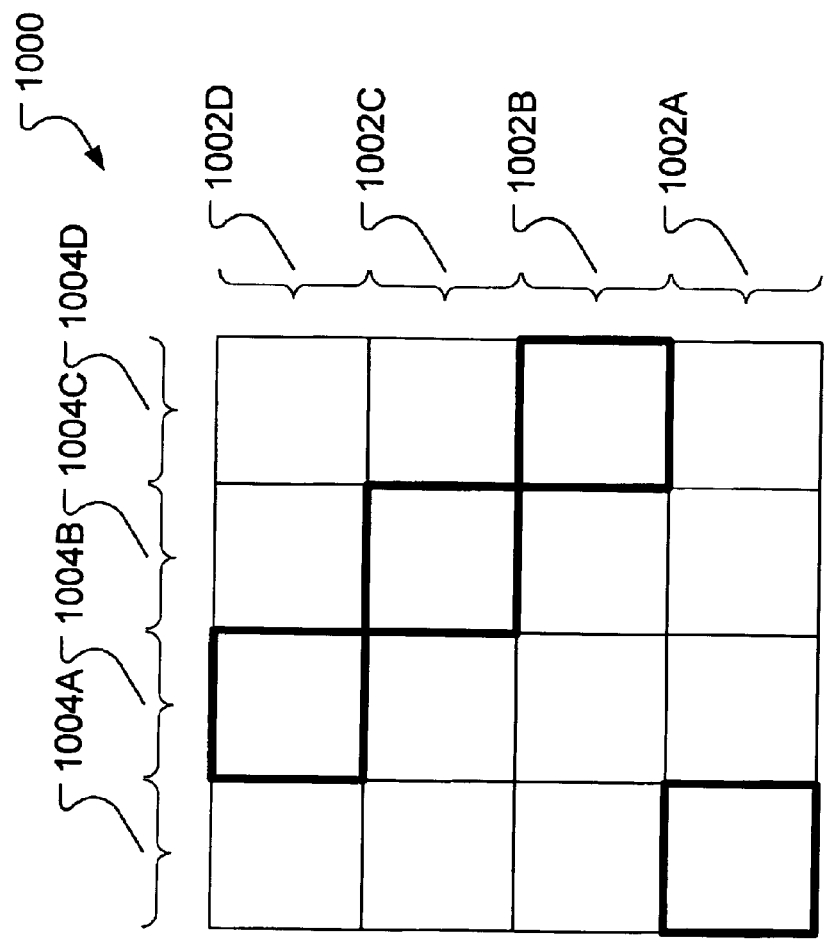
FIG. 10 illustrates an exemplary configuration of groups of ports of a space switch for parallel processing in an embodiment of the present invention.

When the space switch 212 has a relatively high number of ports (input and output) the master controller 210, and in particular the burst-scheduling kernel 310, may take advantage of a parallel processing strategy to further conserve processing time. Such a parallel processing strategy may, for instance, involve considering a 64 by 64 space switch (64 input ports, 64 output ports) as comprising an arrangement of four 16 by 16 space switches. However, so that each input may be connected to any output, four arrangements must be considered. An exemplary configuration 1000 for considering these arrangements is illustrated in FIG. 10. The exemplary configuration 1000 includes four input port groups (sub-sets) 1002A, 1002B, 1002C, 1002D (referred to individually or collectively as 1002) and four output port groups (sub-sets) 1004A, 1004B, 1004C, 1004D (referred to individually or collectively as 1004). Each input port group includes 16 input ports and each output port group includes 16 output ports.

Four processors may perform scheduling for the 64 by 64 space switch, where each processor schedules on behalf of one input port group 1002. A scheduling session may be divided into as many scheduling time periods as there are processors. For each scheduling time period, a given processor (scheduling on behalf of one input port group 1002) will schedule only those connections destined for a particular output group 1004. The output group changes after every scheduling time period such that, by the end of the scheduling session, all four output port groups 1004 have been considered for connections from the input port group 1002 corresponding to the given processor. The state of the exemplary configuration 1000 at a particular scheduling time period is illustrated in FIG. 10. The intersection of the output port group 1004 with the corresponding input port group 1002 for the particular scheduling time period is identified with a bold border.

Figure 11:
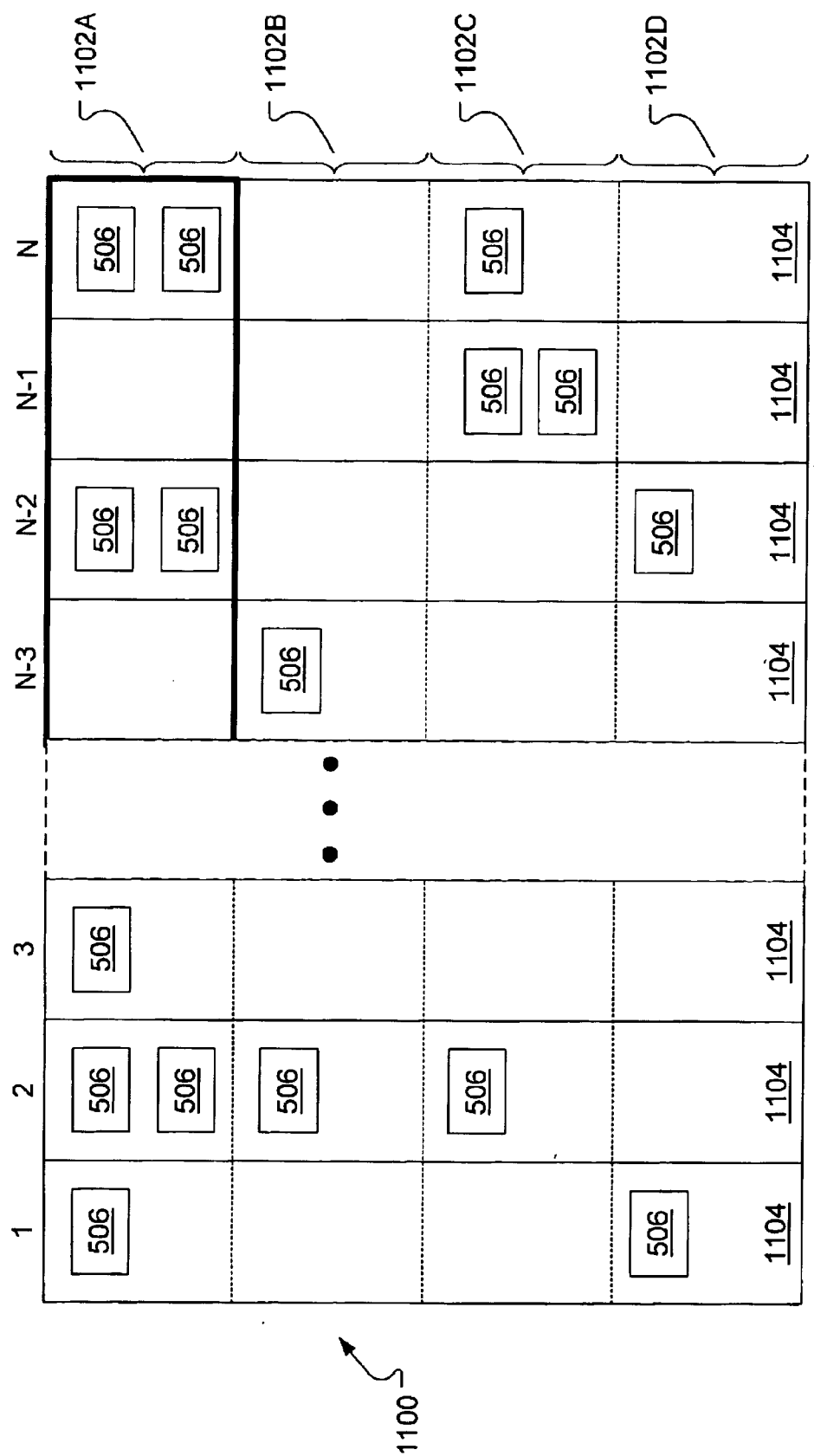
FIG. 11 illustrates a data structure adapted from the data structure in FIG. 5A for use in a parallel processing embodiment of the present invention.

A parallel processing data structure 1100, which is an alternative to the data structure 500 illustrated in FIG. 5A, is illustrated in FIG. 11. Each of the N records 1104 in the parallel processing data structure 1100 is divided into sub-records, where each sub-record in a given record 1104 corresponds to a single output port group 1004. Parameters of received burst transfer requests are stored as entries 506 in a record 1104 according to the input port 202 and in a sub-record according to the output port group 1004. The sub-records that correspond to the output port groups 1004, are illustrated in FIG. 11 as a number of rows 1102A, 1102B, 1102C, 1102D.

When a given processor of the parallel processors in the burst-scheduling unit 408 scans the calendar 600 to detect a future time slot 604 containing an input port identifier 606 (step 802), the input port identifier 606 must be from the input port group 1002 to which the given processor corresponds. The given processor then communicates with the burst parameter queue 406 to acquire entries 506 (step 804) from the parallel processing data structure 1100. The entries 506 are acquired from the record 1104 that corresponds to the input port 202 identified in the input port identifier 606 in the detected time slot 604 and, furthermore, only from the sub-record corresponding to the output port group 1004 under consideration by the given processor in the current scheduling time period. In FIG. 11, the row 1102A of sub-records corresponding to the output port group 1004 under consideration by the given processor associated with a particular input port group 1002A (which includes input ports N3, N2, N1 and N) is identified with a bold border.

Figure 12:
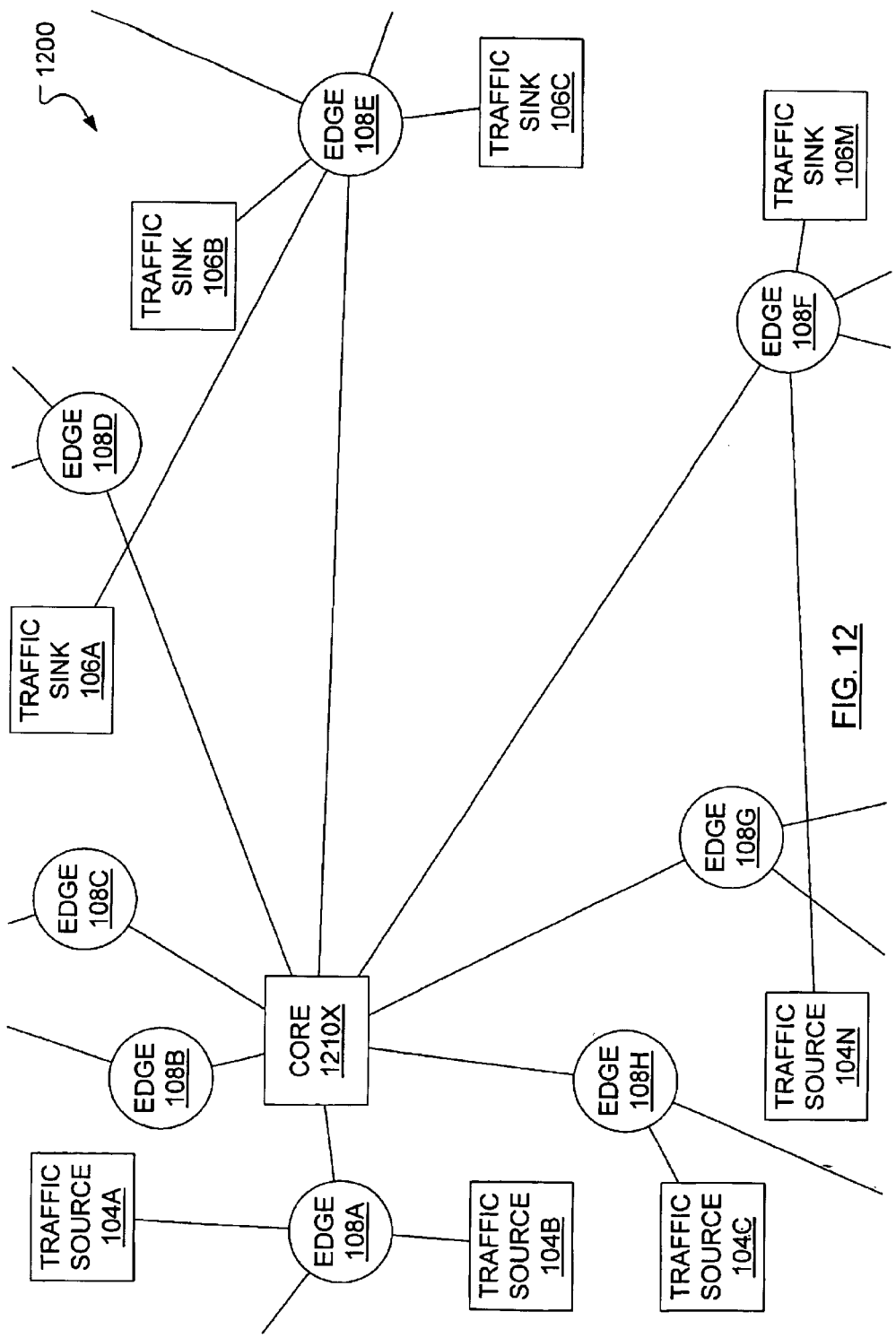
FIG. 12 illustrates a data network for use with an embodiment of the present invention.

A hub and spoke data network 1200 is illustrated in FIG. 12, including a bufferless core node 1210X in place of the core node 102. In the data network 1200, a number of traffic sources 104A, 104B, 104C, 104N (referred to individually or collectively as 104) connect, via the edge nodes 108 and the bufferless core node 1210X, to a number of traffic sinks 106A, 106B, 106C, 106M (referred to individually or collectively as 106). In practice, the traffic sources 104 and the traffic sinks 106 are integrated, for instance, as a personal computer. A space switch and space switch controller are maintained at the bufferless core node 1210X.

Figure 13:
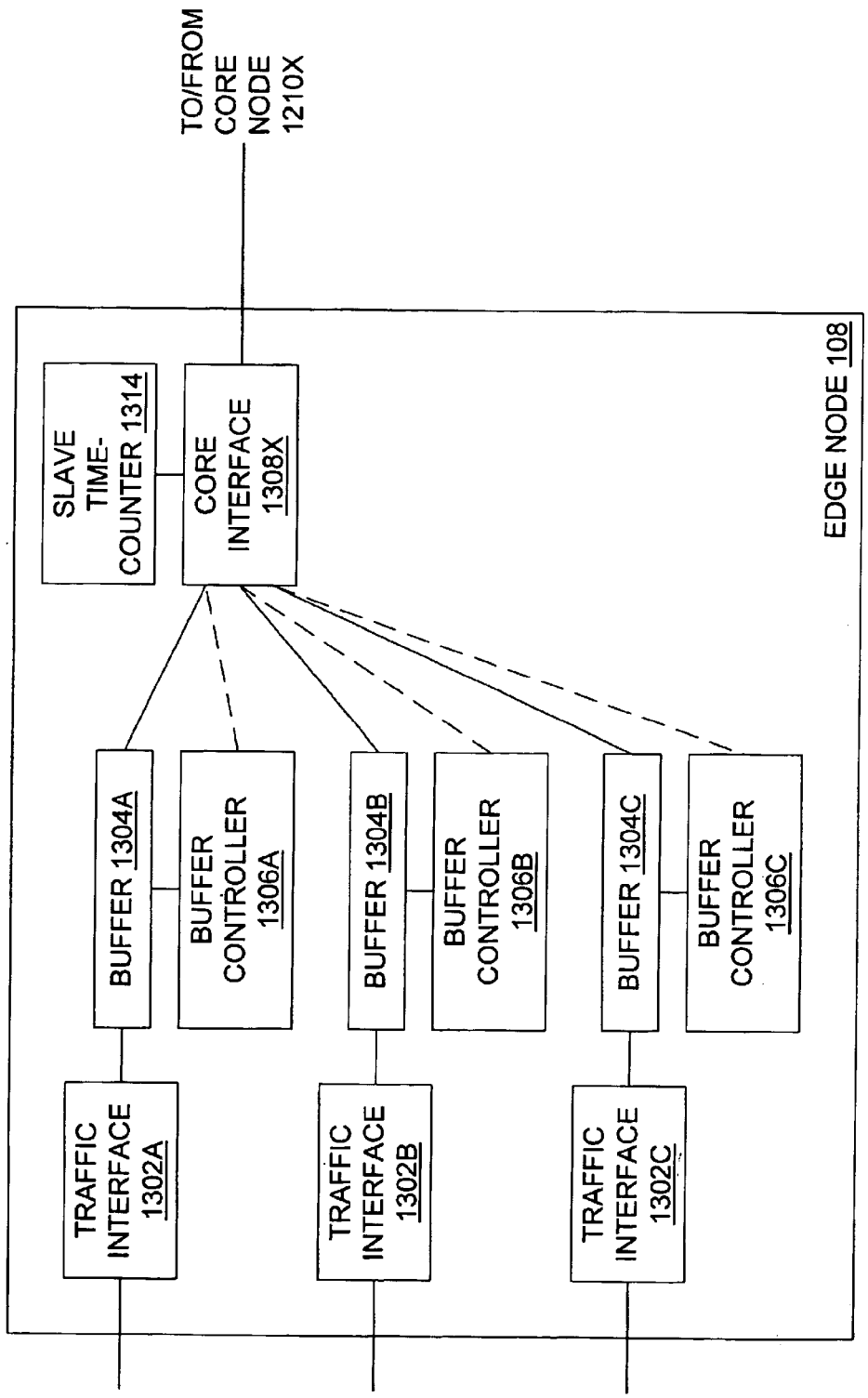
FIG. 13 illustrates an edge node for use in the data network of FIG. 12.

An edge node 108, typical of the edge nodes 108 in FIG. 12, is illustrated in FIG. 13. Traffic is received from the traffic sources 104 or sent to the traffic sinks 106 at traffic interfaces 1302A, 1302B, 1302C (referred to individually or collectively as 1302). The traffic interfaces 1302 connect to buffers 1304A, 1304B, 1304C (referred to individually or collectively as 1304). The buffers 1304 are controlled by buffer controllers 1306A, 1306B, 1306C (referred to individually or collectively as 1306) with regard to the timing of passing traffic to a core interface 1308X that subsequently passes the traffic, to the bufferless core node 1210X. The buffer controllers 1306 also connect to the core interface 1308X for sending, to the bufferless core node 1210X, burst transfer requests in a manner similar to the manner in which the port controllers 206 send burst transfer requests to the master controller 210 in FIG. 2. The core interface 1308X maintains a connection to a slave time counter 1314 for time locking with a master time counter in a master controller.

Figure 14:
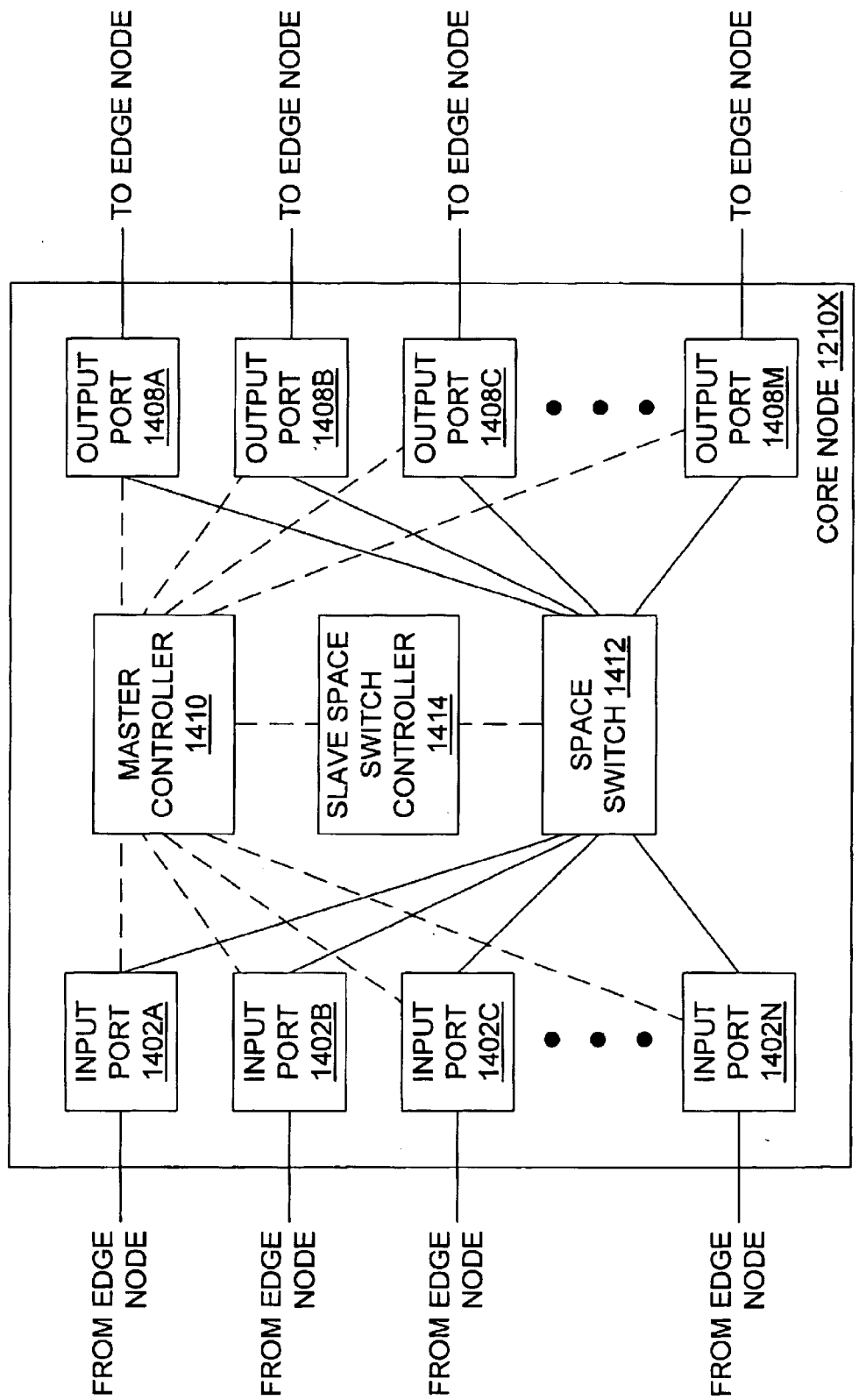
FIG. 14 illustrates an electronic core node for use in the data network of FIG. 12.

At the bufferless core node 1210X, illustrated in detail in FIG. 14, a space switch 1412 connects N input ports 1402A, 1402B, 1402C, . . . , 1402N (referred to individually or collectively as 1402) to M output ports 1408A, 1408B, 1408C, . . . , 1408M (referred to individually or collectively as 1408) under control of a slave space switch controller 1414. Each of the N input ports 1402 is arranged to send burst transfer requests received from the edge nodes 108 to a master controller 1410 and to send burst traffic to the space switch 1412. If, for instance, a particular input port 1402 is arranged to receive a Wavelength Division Multiplexed (WDM) signal having 16 channels, one channel (i.e., one wavelength) maybe devoted to the transfer of burst transfer requests from the subtending edge node 108 to the master controller 1410. As in the core node 102 of FIG. 2, the master controller 1410 passes scheduling information to the slave space switch controller 1414.

The master controller 1410 may consult the edge nodes 108, via the output ports 1408, to perform conventional operational and maintenance functions. However, to avoid consulting the edge nodes 108, edge-to-edge rate allocations may be introduced and updated as the need arises. The interval between successive updates may vary between 100 milliseconds and several hours, which is significantly larger than a mean burst duration.

In overview, a traffic interface 1302A at a source edge node 108A receives a burst from a subtending traffic source 104A. The burst is stored in the buffer 1304A. Parameters indicating The size and destination (e.g., a destination edge node 108E) of the burst are communicated from the buffer controller 1306A, via the core inter face 1308X, to the bufferless core node 1210X in a burst transfer request. At the bufferless core node 1210X, the burst transfer request is received at one of the input ports 1402 are sent to the master controller 1410. The master controller 1410 executes a burst scheduling algorithm to generate scheduling information and communicates relevant parts of the generated scheduling information to the edge nodes 108. The master controller 1410 also communicates relevant parts of the generated scheduling information to the slave space switch controller 1414. At the edge node 108A, the buffer 1304A sends the burst to the bufferless core node 1210X, via the core interface 1308X, according to the scheduling information received at the buffer controller 1306A. At the space switch 1412 of the bufferless core node 1210X, a connection is established between the input port 1402A and the output port 1408B such that the burst is successfully transferred from the source edge node 108A to the destination edge node 108E.

Figure 15:
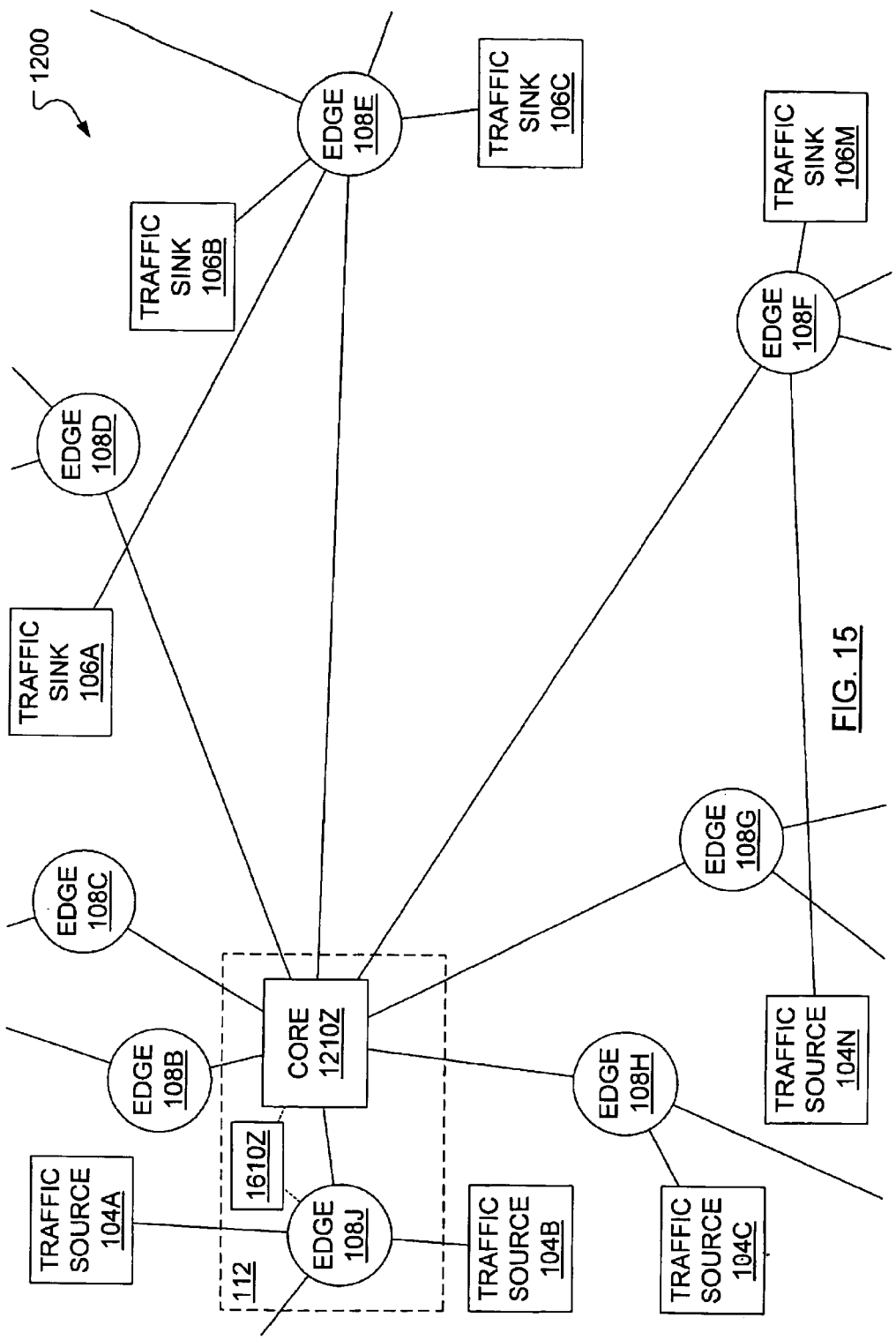
FIG. 15 illustrates a data network that is an adaptation of the data network of FIG. 12 wherein a core node and an edge node have been collocated.

As will be apparent to a person skilled in the art, the duty of routing of burst transfer requests to the master controller 1410 and bursts to the space switch 1412 may present a problem to the design of the input ports 1402 if the space switch 1412 is optical. One solution to this problem is to relieve the input ports 1402 of this duty. In a version of the data network 1200 of FIG. 12, which is altered to suit an optical space switch and illustrated in FIG. 15, a bufferless core node 1210Z is collocated with an edge node 108J at a location 112. Additionally, a stand-alone master controller 1610Z exists separate from the bufferless core node 1210Z. The collocated edge node 108J maintains a connection to the stand-alone master controller 1610Z for transferring burst transfer requests, received from other edge nodes 108 (via the bufferless core node 1210Z) and the subtending traffic sources 104, to the space switch controller in the bufferless core node 1210Z. In this solution, it is necessary that the edge nodes 108 be aware that burst transfer requests are to be sent to the collocated edge node 108J. This solution avoids dedication of an entire wavelength to signaling, which typically has a low bit rate.

Figure 16:
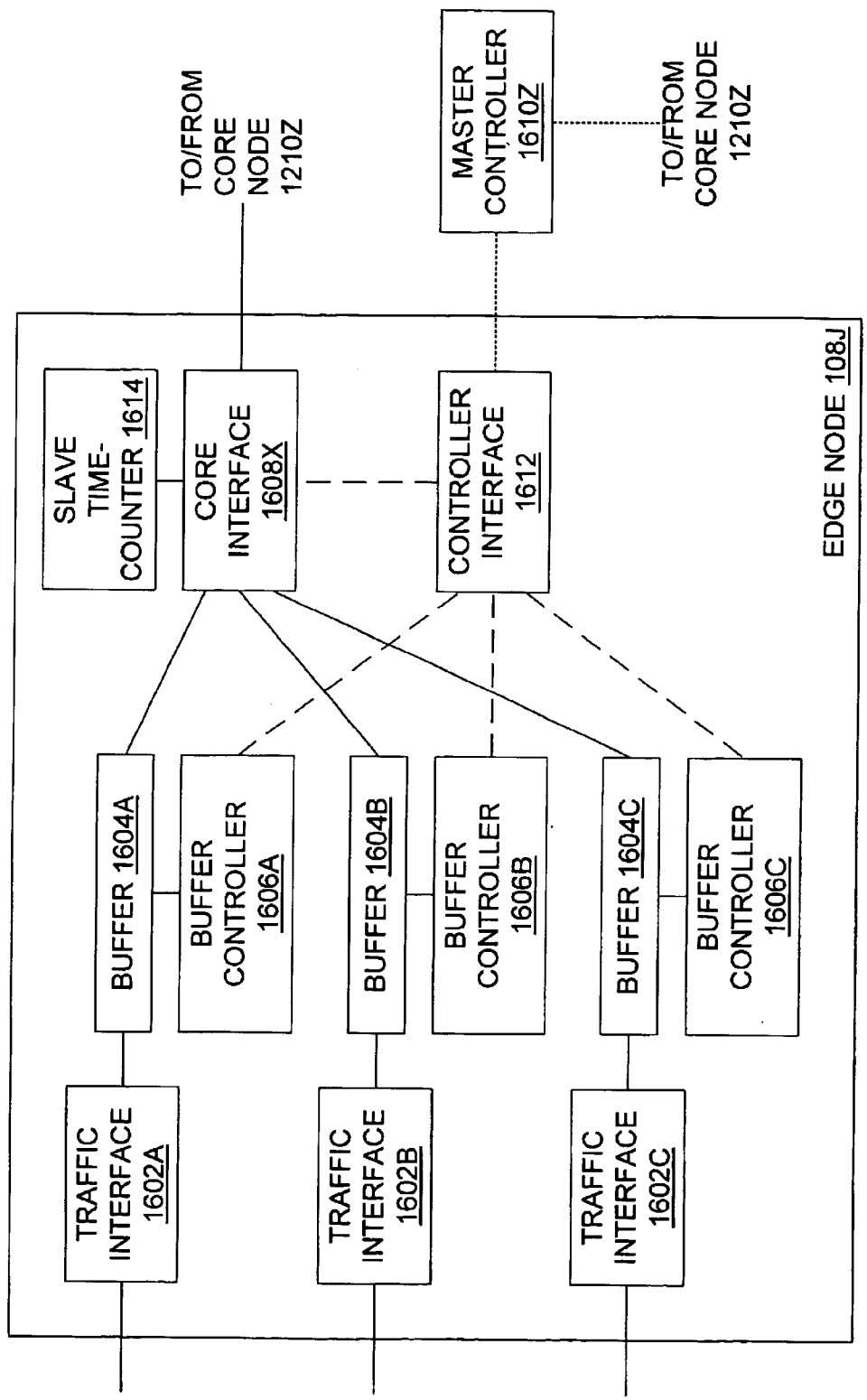
FIG. 16 illustrates an edge node for use in the data network of FIG. 15.

In FIG. 16, the collocated edge node 108J is illustrated in detail. Like the typical edge node 108 of FIG. 13, the collocated edge node 108J includes traffic interfaces 1602A, 1602B, 1602C, buffers 1604A, 1604B, 1604C, buffer controllers 1606A, 1606B, 1606C (referred to individually or collectively as 1606) and a core interface 1608X. The core interface 1608X also maintains a connection to a slave time counter 1614Z for time locking with a master time counter in the master controller 1610Z. However, in addition to the typical edge node 108 in FIG. 13, the collocated edge node 108J also includes a controller interface 1612 for sending burst transfer requests to the stand-alone master controller 1610Z. The buffer controllers 1606 communicate burst transfer requests to the controller interface 1612 rather than to the core interface 1608X, as is the case in the typical edge node 108 in FIG. 13. The core interface 1608X also communicates other burst transfer requests to the controller interface 1612, in particular, burst transfer requests received from other edge nodes 108. The stand-alone master controller 1610Z generates scheduling information based on the burst transfer requests and sends the scheduling information to the slave space switch controller in the bufferless core node 1210Z.

Figure 17:
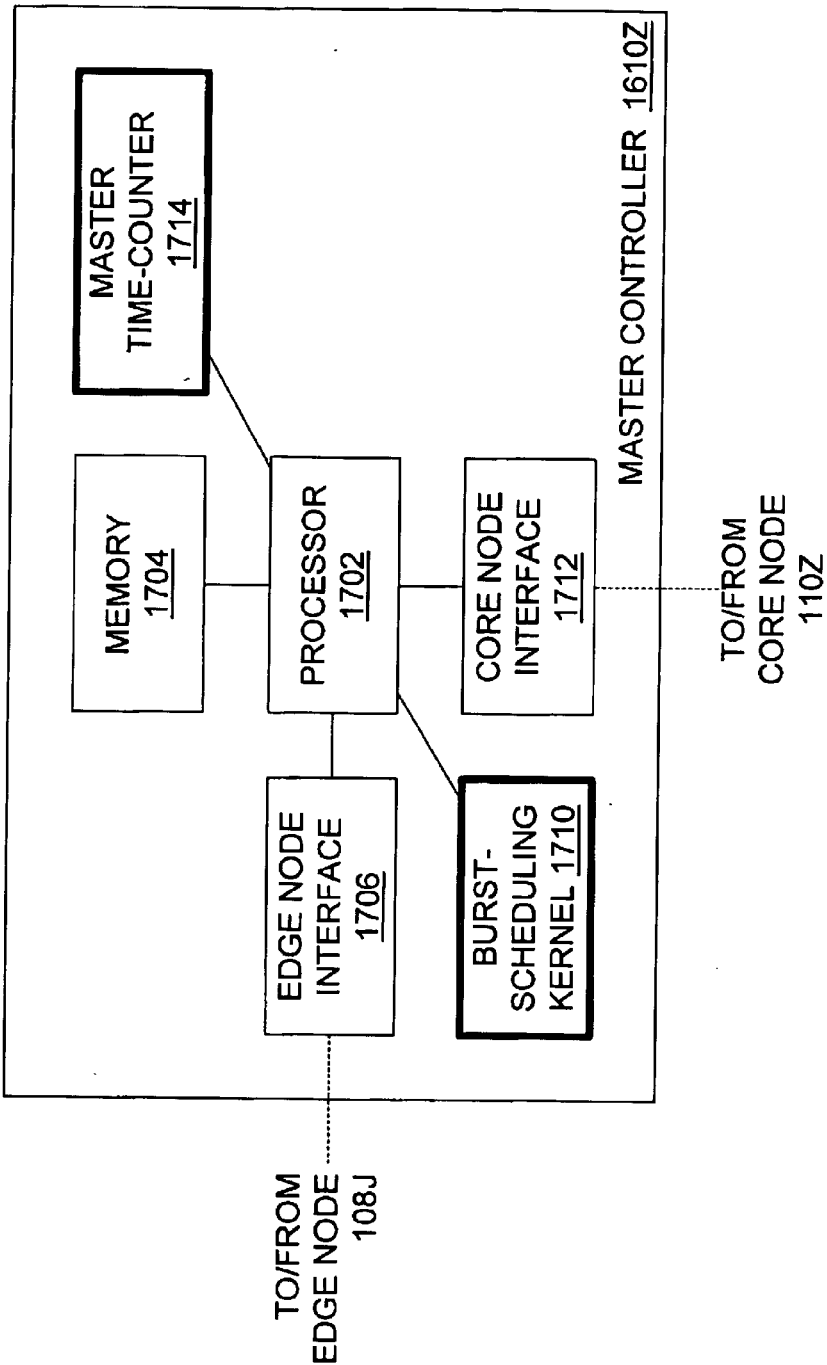
FIG. 17 illustrates a master controller including a burst scheduler for use in the data network of FIG. 15.

As illustrated in detail in FIG. 17, the stand-alone master controller 1610Z includes a processor 1702. The processor 1702 maintains connections to a memory 1704, an edge node interface 1706, a core node interface 1712 and a master time counter 1714. At the edge node interface 1706, the master controller 210 receives burst transfer requests from the collocated edge node 108J. The processor 1702 is also connected to a burst-scheduling kernel 1710. Based on the burst transfer requests received from the processor 1702, the burst-scheduling kernel 1710 determines appropriate timing for switching at the space switch at the bufferless core node 1210Z. According to the determined timing received from the burst-scheduling kernel 1710, the processor 1702 passes scheduling information to the bufferless core node 1210Z via the core node interface 1712. The processor 1702 also controls the timing of transmission of bursts, from the edge nodes 108 to the bufferless core node 1210Z, by transmitting scheduling information to the edge nodes 108 via the edge node interface 1706 and the collocated edge node 108J.

Figure 18:
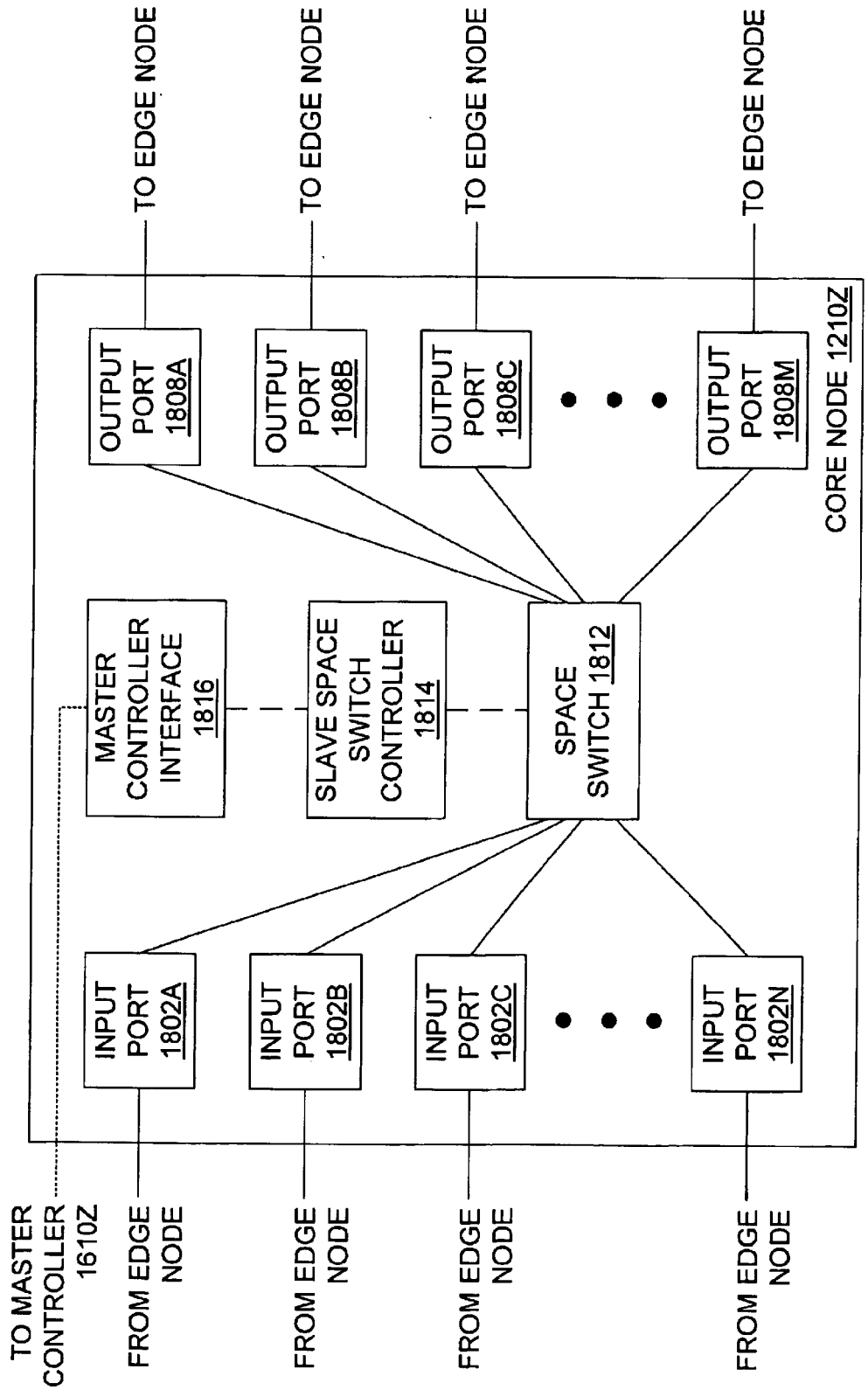
FIG. 18 illustrates a core node for use in the data network of FIG. 15.

At the bufferless core node 1210Z, illustrated in detail in FIG. 18, a space switch 1812 connects N input ports 1802A, 1802B, 1802C, . . . , 1802N (referred to individually or collectively as 1802) to M output ports 1808A, 1808B, 1808C, . . . , 1808M (referred to individually or collectively as 1808) under control of a slave space switch controller 1814. Instead of requiring that the N input ports 1802 be arranged to send burst transfer requests from the edge nodes 108 to a master controller and send bursts to the space switch 1812, burst transfer requests pass through the bufferless core node 1210Z, and are sent to the collocated edge node 108J. The collocated edge node 108J then forwards the burst transfer requests to the stand-alone master controller 1610Z, where scheduling information is generated. The scheduling information is received from the stand-alone master controller 1610Z by a master controller interface 1816. The slave space switch controller 1814 then receives the scheduling information from the master controller interface 1816.

The bufferless core node 1210Z need not be limited to a single space switch 1812. Especially where each input port 1802 and output port 1808 supports multiple channels over respective links to or from respective edge nodes 108, as is the case in WDM, the bufferless core node 1210Z may include an assembly of multiple parallel space switches (not shown). Each of the multiple space switches may require an associated burst-scheduling kernel, such as the burst-scheduling kernel 1710 in FIG. 17, to be located at the master controller 1610Z of the bufferless core node 1210Z. Alternatively, each of the multiple space switches may be associated with a unique burst scheduling unit (see 408 in FIG. 4).

The space switches in the assembly of multiple parallel space switches operate totally independently. The traffic to a specific edge node 108 may, however, be carried by any of the channels of a multi-channel link (WDM fiber link) from a source edge node 108 to the bufferless core node 1210. Preferably, a load-balancing algorithm (not described herein) is used to balance the traffic and thus increase throughput and/or decrease scheduling delay.

Successive bursts to the same sink edge node 108 may be transferred using different channels (different wavelengths) and, hence, may be switched in different space switches in the bufferless core node 1210. However, the transfer of successive bursts to the same sink edge node 108 using different channels should not be expanded to include the transfer of successive bursts to the same sink edge node 108 using different links where the delay differential between links (possibly several milliseconds) may complicate assembly of the bursts at the sink edge node 108.

Note that conventional WDM demultiplexers and WDM miltiplexers are required at the input ports 1802 and output ports 1808 of a bufferless core node 1210 employing multiple parallel space switches. They are not illustrated in the figures, however, their use being well known in the art.

An advantage of burst switching is a freedom to select a space switch on a per-burst basis, as long as a predetermined time separation (a microsecond or so) is provided between successive bursts of a single data stream. The time separation is required to offset the effect of propagation delay differentials present in different wavelengths of the same WDM signal.

Returning to FIG. 12, propagation delay may be considered in view of the data network 1200. If the edge node 108A is one kilometer away from the bufferless core node 1210X, scheduling information may take five microseconds to pass from the bufferless core node 1210X to the edge node 108A in an optical-fiber link, Similarly, a burst sent from the edge node 108A would take five microseconds to travel to the bufferless core node 1210X. A time period lasting five microseconds is represented in the calendar 600 by 500 time slots 604 of 100-nanoseconds each. It may be that, as a consequence of propagation delay, a burst may arrive at the bufferless core node 1210X after the time at which the burst was scheduled to be passing through the space switch 1412, Consequently, given knowledge, at the bufferless core node 1210X, of an estimate of a maximum round trip propagation delay associated with the edge nodes 108, scheduling can be arranged to take the propagation delay into account. For instance, the burst-scheduling kernel 1710 may schedule such that the earliest a burst may be scheduled, relative to a current time in the master time counter 1714, is at least the estimated maximum round trip propagation delay time into the future.

Notably, propagation delay differential was not a problem in the core node 102 of FIG. 2, which had input buffers. The collocation of the collocated edge node 108J with the bufferless core node 1210Z in FIG. 15 removes concern of propagation delay differentials for traffic originating at the traffic sources 104A, 104B connected to the collocated edge node 108J. However, for the other edge nodes 108, a time locking scheme is required so that bursts may be correctly scheduled.

The propagation delay between the time at which a burst leaves one of the other edge nodes 108 (i.e., the edge nodes 108 that are not collocated with the bufferless core node 1210Z) and the time at which the burst arrives at the bufferless core node 1210Z may be different for each of the other edge nodes 108. To switch these bursts, without contention or a requirement for burst storage at the bufferless core node 1202Z, the other edge nodes 108 must be time locked to the bufferless core node 1210Z. A time locking technique, also called time coordination, is described in the applicant's U.S. patent application Ser. No. 09/286,431, filed on Apr. 6, 1999, and entitled "Self-Configuring Distributed Switch," the contents of which are incorporated herein by reference. With time locking, the scheduling method in accordance with the present invention guarantees that bursts arrive to available resources at the bufferless core node 1210Z.

Given the collocation of the collocated edge node 108J with the bufferless core node 1210Z and the corresponding fact that all burst transfer requests of the bufferless core node 1210Z pass though the collocated edge node 108J, each other edge node 108 may "time lock," with the collocated edge node 108J.

The time locking may be performed using any one of a number of time locking schemes. In one such scheme, each edge node 108 includes at least one local time counter (e.g., the slave time counter 1314 of FIG. 13) of equal width W. In one embodiment of the present invention, a time locking request may be sent from a particular edge node 108E (FIG. 15), while noting the sending time (i.e., the value of the slave time counter at the particular edge node 108E when the time locking request is sent), to the master controller 1610Z. When the time locking request is received at the master controller 1610Z, the arrival time (i.e., the value of the master time counter 1714 at the arrival time) is noted time locking response is generated, including an indication of the arrival time, and sent to the particular edge node 108E. A time difference between sending time and arrival time is determined at the particular edge node 108E and used to adjust the slave time counter at the particular edge node 108E. In future, scheduling information is received at the particular edge node 108E from the stand-alone master controller 1610Z, for instance, "start sending burst number 73 at a time counter state 3564." If the particular edge node 108E starts sending burst number 73 at slave time counter state 3564, the beginning of the burst will arrive at the bufferless core node 1202Z at master time counter state 3564. Preferably, the duration of each time counter cycle is equal and substantially larger than a maximum round-trip propagation delay from any edge node 108 to any core node 1210 in the data network 1200. Furthermore, the maximum round-trip propagation delay should be taken into account when performing scheduling at the stand-alone master controller 1610Z. Preferably, the counters related to the time locking scheme are included in the controller interface 1612 of the collocated edge node 108J of FIG. 16 and in the core interface of the generic edge node 108 of FIG. 13.

Figure 19:
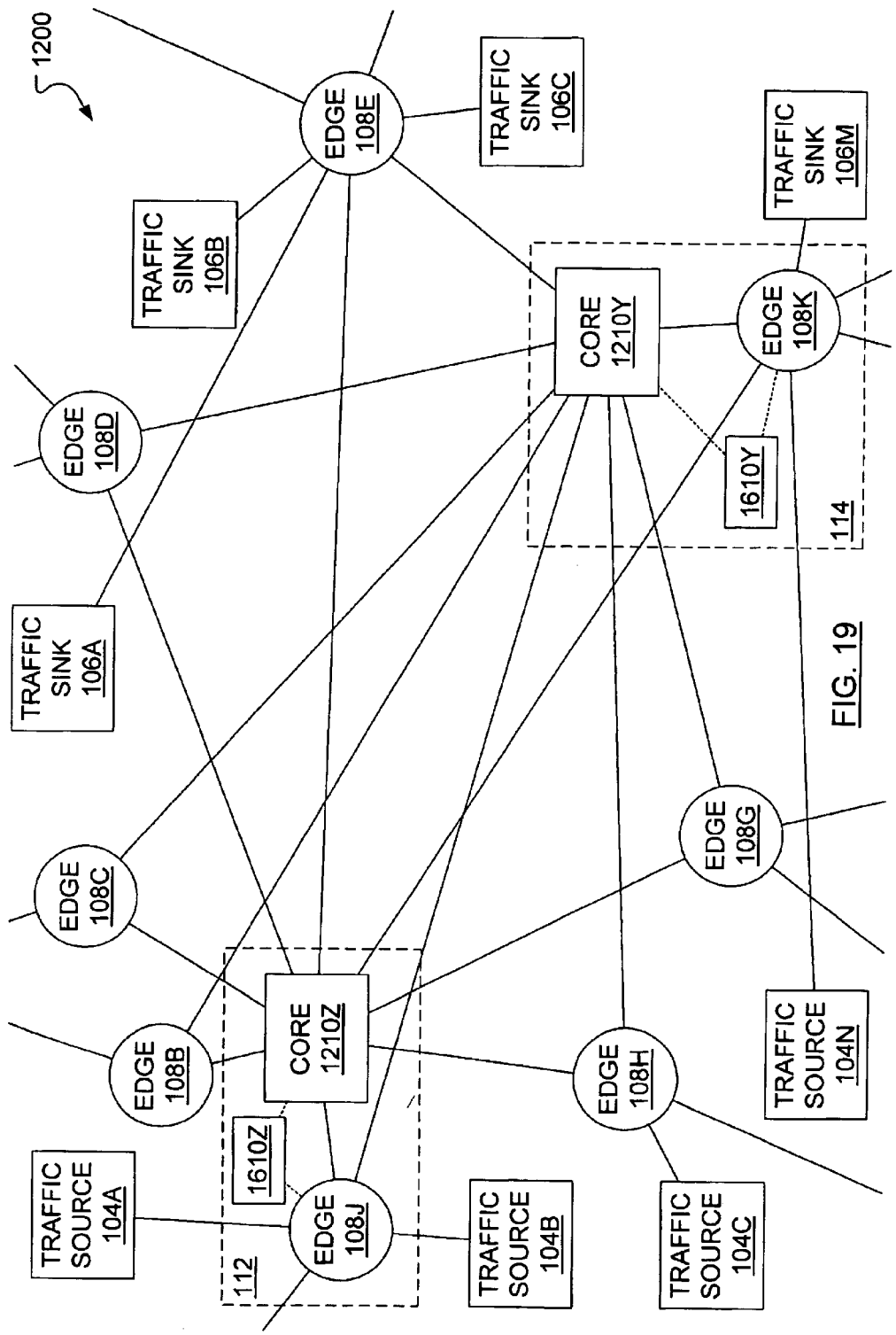
FIG. 19 illustrates a data network that is an adaptation of the data network of FIG. 15 wherein a second core node and an second edge node have been collocated.

FIG. 19 illustrates the data network 1200 supplemented with an additional bufferless core node 1210Y. With the additional bufferless core node 1210Y, a flow control process, which operates at a higher level than the switch operations, may assign one of the bufferless core nodes 1210Z, 1210Y (referred to individually or collectively as 1210) to each traffic stream originating at a particular edge node 108, where a traffic stream is an aggregation of traffic with identical source and destination edge nodes 108. When a burst arrives at a given edge node 108, the given edge node 108 may send a burst transfer request to the core node (say bufferless core node 1210Z) assigned to the traffic stream of which the burst is part. Scheduling information is returned to the given edge node 108. The given edge node 108 may then send the burst to the assigned bufferless core node 1210Z according to the timing represented in the scheduling information. The additional bufferless core node 1210Y is illustrated as collated with an edge node 108K at an additional location 114. An additional master controller 1610Y, corresponding to the additional bufferless, core node 1210Y, is also present at the additional location 114.

Figure 20:
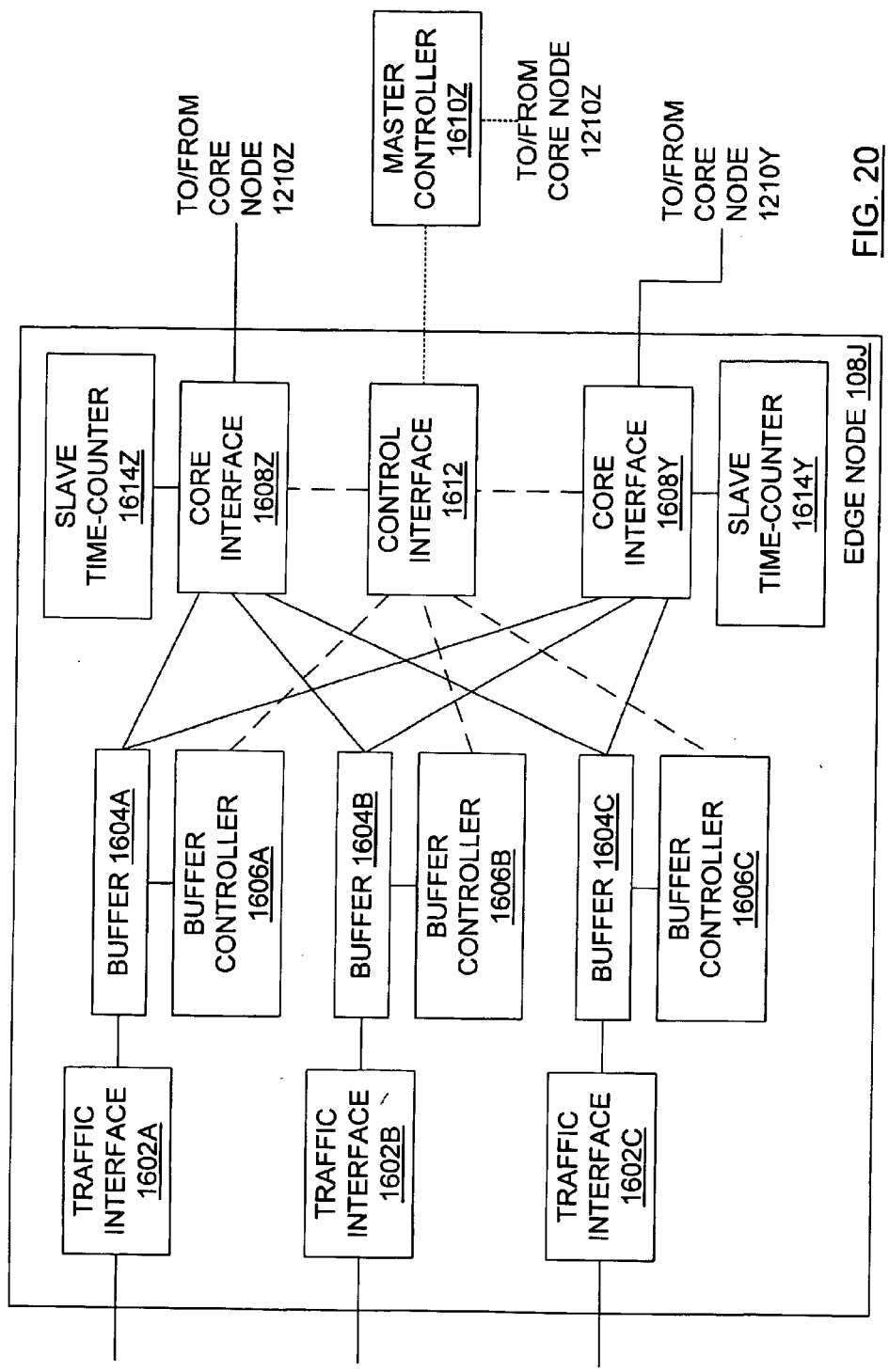
FIG. 20 illustrates an edge node for use in the data network of FIG. 19.

An edge node 108 communicates with all core nodes 1210 in the sending and receiving modes. As such, the edge nodes 108 should be adapted to communicate with more than one bufferless core node 1210. This adaptation is shown for the collocated edge node 108J in FIG 20. Notably different from the collocated edge node 108J as illustrated in FIG. 16 is the addition of a core interface 1608Y corresponding to the bufferless core node 1210Y. The core interface 1608Y corresponding to the bufferless core node 1210Y requires a connection to a slave time counter 1614Y. As will be apparent to a person skilled in the art, there may be many more than two bufferless core nodes 1210 in a data network and many more than eight edge nodes 108.

As stated above, there is a requirement that a slave time counter at a given edge node 108 be time locked to the master time counter of the master controller 1610 of the bufferless core node 1210. The scheduling information transmitted by the master controller 1610 to the edge nodes 108 is based on the time indication of the master time counter 1714 as it corresponds to the scheduled time slot in the calendar 600. The time slots 604 in the calendar 600 must, therefore, also be time locked to the master time counter 1714. The selection of the time counter cycle in use at the master time counter 1714 and the calendar cycle are important design choices. Where a master time counter 1714 count, using W bits, the duration of the master time counter cycle is $2^W$ multiplied by the duration of a period of a clock used to drive the master time counter. With W=32, and a clock period of 16 nanoseconds, for example, the number of counter states is about $4.29 \times 10^9$ and duration of the master time counter is more than 68 seconds. This is orders of magnitude higher than the round-tip propagation delay between any two points on Earth (assuming optical transmission).

Increasing the duration of the master time counter 1714 involves adding a few bits, resulting in a very small increase in hardware cost and transport of time locking signals across the network. By contrast, increasing the duration of the calendar 600 requires increasing the depth of a memory used to maintain the calendar 600 and/or increasing the duration of each time slot 604 in the calendar. The latter results in decreasing the accuracy of time representation, and hence in wasted time, as will be explained below.

If, for example, each time slot 604 has a duration of eight microseconds and the number of calendar time slots 604 is 65,536, the duration of the calendar 600 is more than 500 milliseconds. A time slot 604 of eight microseconds is, however, comparable with the duration of a typical burst. At 10 Gb/s, an eight microsecond bursts is about ten kilobyte long. It is desirable that the duration of each time slot 604 be a small fraction of the mean burst duration. A reasonable duration for a time slot 604 is 64 nanoseconds. However, if the duration of the calendar 600 is to be maintained at 500 milliseconds, the calendar 600 requires eight million slots. A compromise is to select a duration of the calendar 600 that is just sufficient to handle the largest possible burst and use an associated adder or cycle counter to be cognizant of the calendar time relationship to the master time counter time. The largest burst duration would be imposed by a standardization process. In a channel of 10 Gb/s, a burst of one megabyte has a duration of less than one millisecond. A standardized upper-bound of the burst length is likely to be even less than one megabyte in order to avoid delay jitter. Thus, the duration of the calendar 600 can be selected to be loss than 16 milliseconds. With a duration of each time slot 604 set to 64 nanoseconds, the number of required time slots 604 would be about 262,144. This can be placed in four memory devices of 65,536 words each, a word corresponding to a time slot 604.

Relating a time slot 604 in the calendar 600 to the state of the master time counter 1714 is greatly simplified if the ratio of the number of master time counter states to the number of time slots 604 is a power of two, and the ratio of the duration of a time slot 604 to the duration of the clock used to drive the master time counter is also a power of two. Notably, the number of master time counter states exceeds or equals the number of calendar slots and the duration of a calendar slots exceeds or equals the clock period.

If the width of the master time counter is 32 bits, the width of a calendar address is 18 bits ($2^{18}$, i.e., 262,144 time slots 604), and the duration of a time slot 604 is four times the period of the clock used to drive the master time counter, then duration of the master time counter is 4,096 times the duration of the calendar 600. Reducing the width of the master time counter to 24 bits, with 262,144 calendar slots, a clock period of 16 nanoseconds and a duration of each time slot 604 of 64 nanoseconds, the duration of the master time counter 1714 becomes about 268.72 milliseconds, which is 16 times the calendar period of about 16.77 milliseconds. The master clock period is selected to be reasonably short to ensure accurate time representation for time locking purposes.

Figure 21:
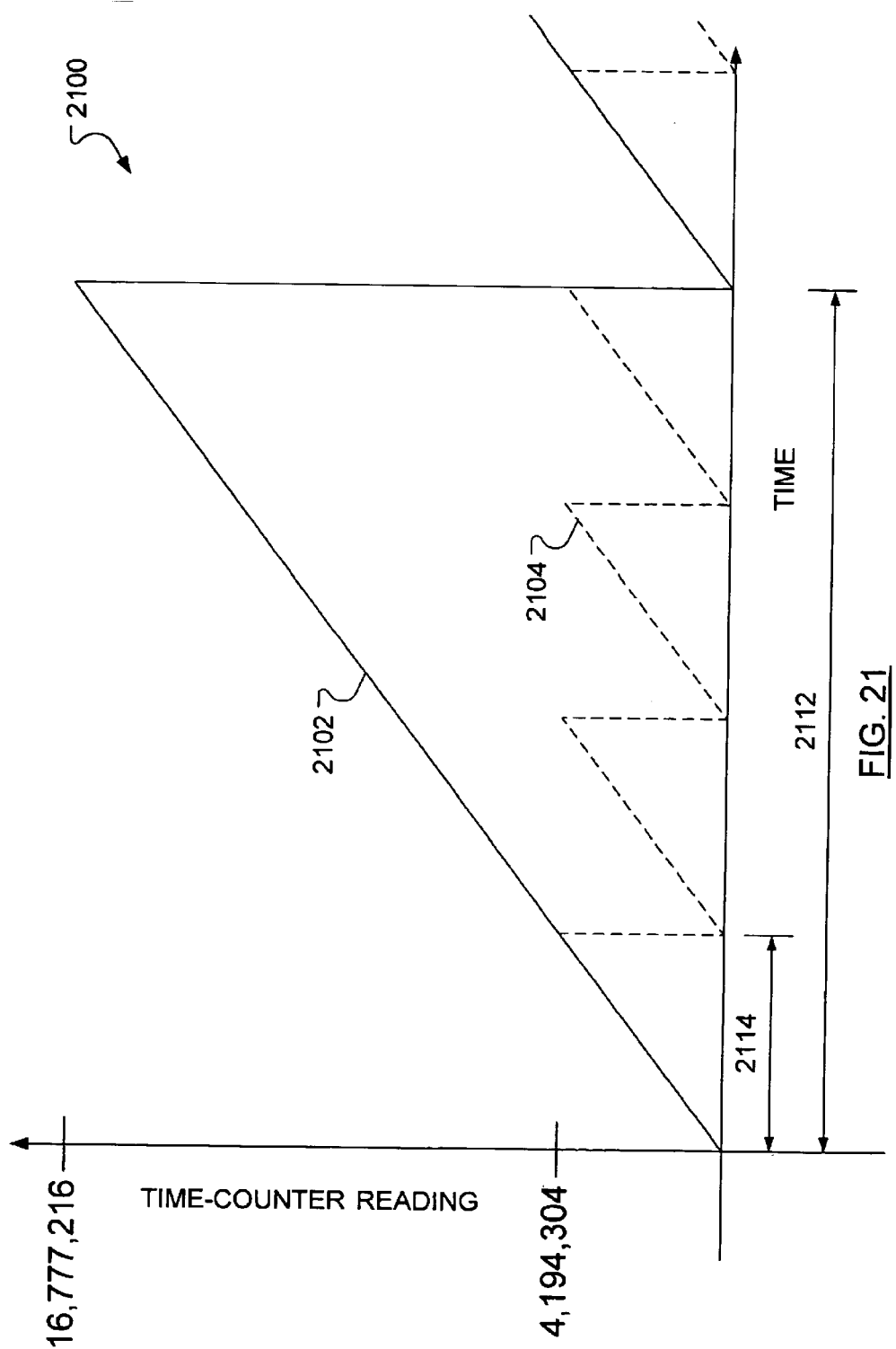
FIG. 21 depicts a master time counter cycle and a calendar cycle for a master controller for use in an embodiment of the present invention.

FIG. 21 depicts a master time counter cycle 2102 and a calendar cycle 2104 for an exemplary case wherein a duration 2112 of the master time counter cycle 2102 is exactly four times a duration 2114 of the calendar cycle 2104. Time locking of the calendar to the master time counter is essential as indicated in FIG. 21.

Figure 8:
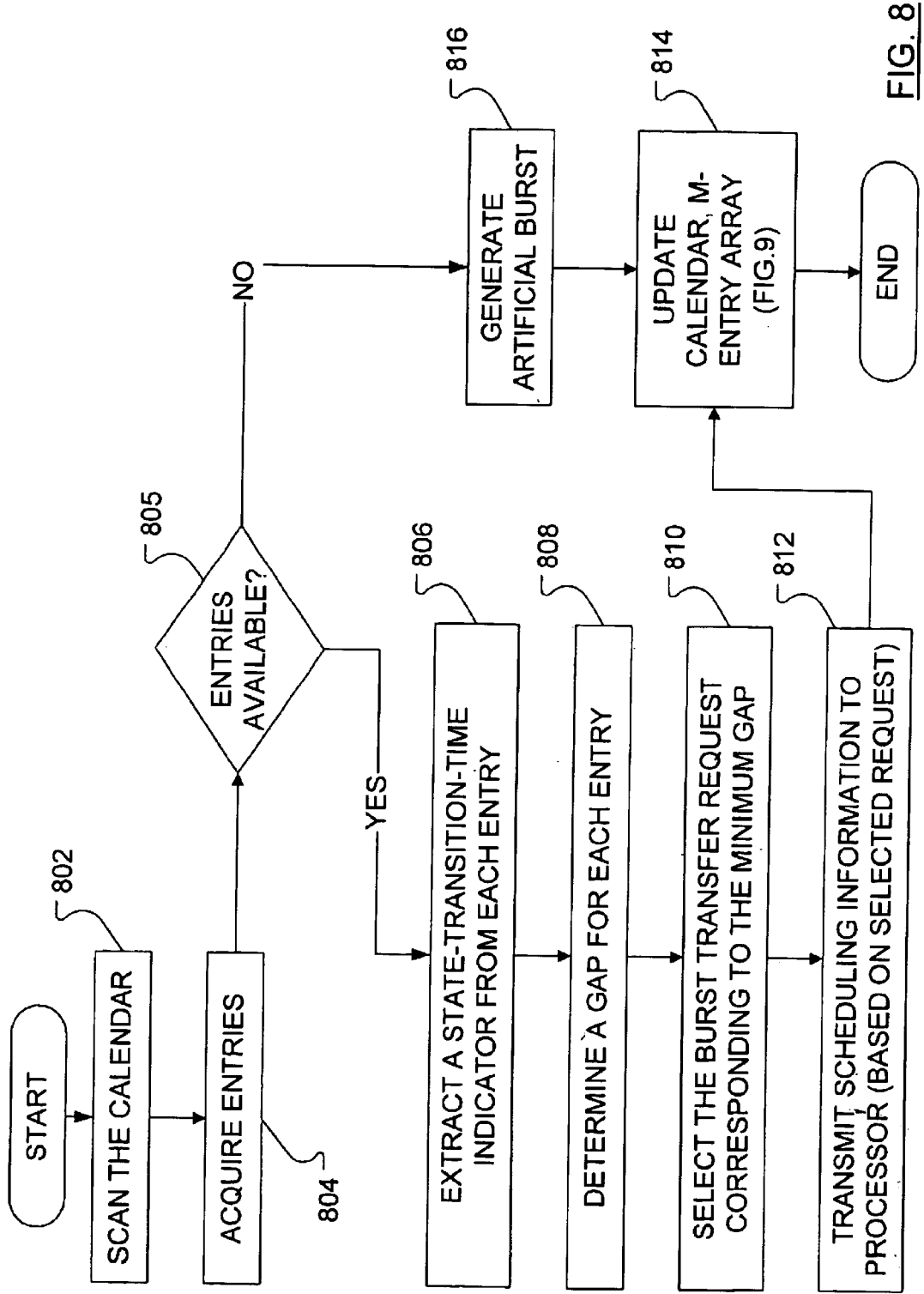
FIG. 8 illustrates steps of a burst scheduling method for use in an embodiment of the present invention.
Figure 22:
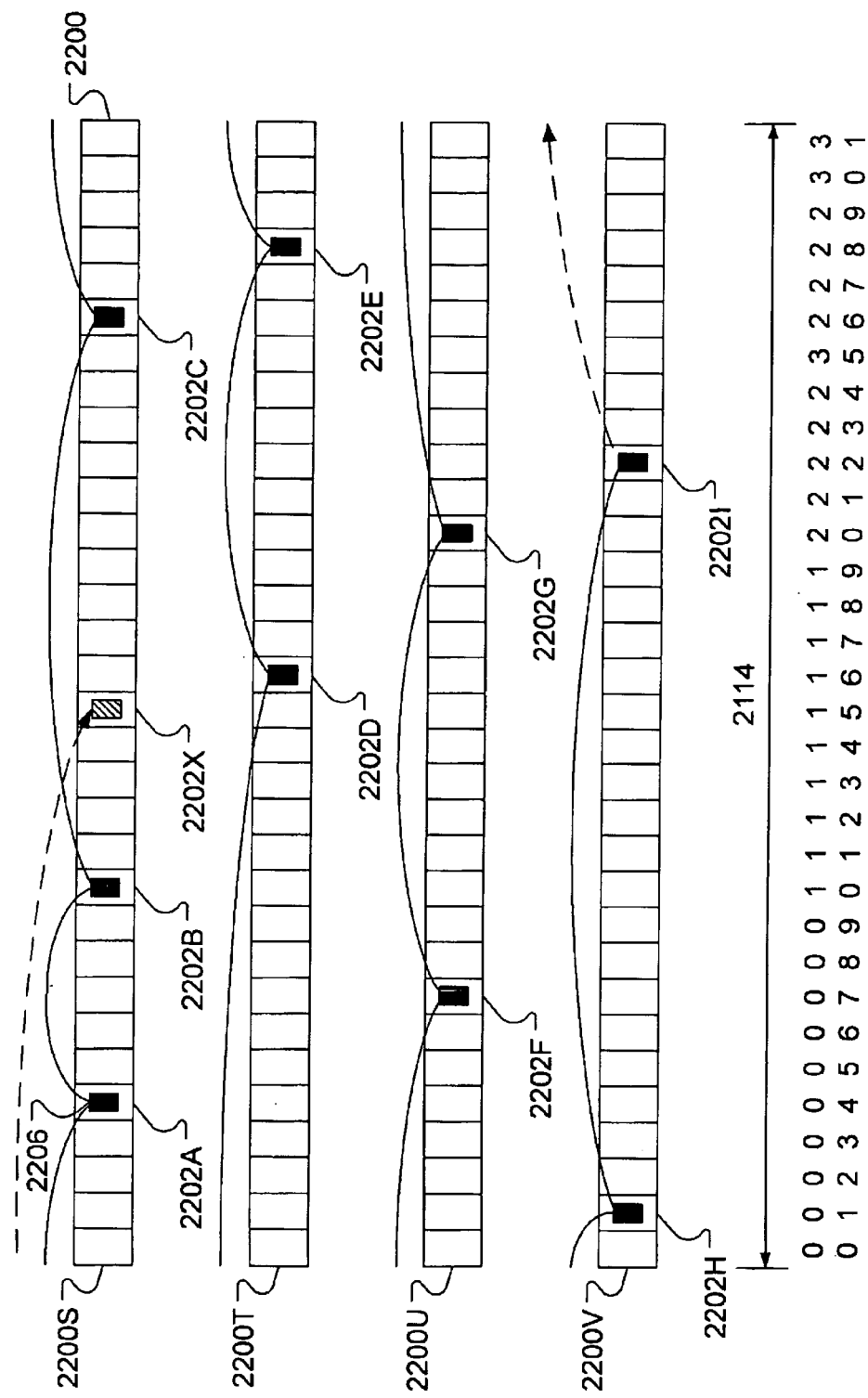
FIG. 22 illustrates scheduling of burst transfers and resultant changes in the state of a calendar in an embodiment of the present invention.

The scheduling of future burst transfers based on burst transfer requests received from a specific edge node 108, associated with a specific input port of a bufferless core node 1210, is illustrated in FIG. 22. Changes in the state of a calendar 2200 are illustrated as they correspond to the specific input port. In particular, the calendar 2260 has 32 time slots and is shown as four calendar cycles 2200S, 2200T, 2200U, 2200V. In this example, the duration of the master time counter is four times the duration of the calendar 2200. A time slot 2202A contains an identifier of the input port, typically an input port number. Each other time slot in the calendar 2200 contains either an input port identifier or a null identifier, although, for simplicity, these identifiers are not shown. As the calendar 2200 is scanned, the time slot 2202A is encountered and an input port identifier 2206 is recognized. The burst scheduling method of FIG. 8 is then performed, along with the map maintenance method of FIG. 9. These methods result in the input port identifier 2206 being replaced with a null identifier in time slot 2202A and the input port identifier 2206 being written in time slot 2202B. The methods of FIGS. 8 and 9 are repeated when the input port identifier 2206 is encountered in time slot 2202B, resulting in a null identifier in time slot 2202B and the input port identifier 2206 being written in time slot 2202C. When the input port identifier 2206 is encountered in time slot 2202C, the input port identifier 2206 being written in time slot 2202D which is in the second calendar cycle 2200T and has a numerically smaller index in the calendar 2200. The index of time slot 2202D is smaller than the index of time slot 2202C because the adder determining the index of the time slot in which to write the input port identifier 2206 (step 902) has a word length that exactly corresponds to the number of time slots in the calendar 2200 (note that calendar length is a power of 2). When the input port identifier 2206 is encountered in time slot 2202I in the fourth calendar cycle 2200V, the input port identifier 2206 is written to time slot 2202X in the first calendar cycle 2200S. Scheduling availability of the input port in the first calendar cycle 2200S means that the input port will not be available until the master clock cycle subsequent to the master clock cycle in which time slot 2202I was encountered.

It is emphasized that the scheduling procedure described above enables scheduling bursts for a look-ahead period as large as the duration of the master time counter. Where the duration of the master time counter is 268 milliseconds ($2^{24}$ master time counter slots, 16 nanosecond clock period), for example, at 10 GHz, bursts of cumulative length as high as 200 megabytes can be scheduled.

To compute a scheduled time indication, i.e., the master time counter state corresponding to the scheduled time slot, to be reported to a respective edge node, an indication of the relative calendar cycle number with respect to the master time counter cycle must be provided along with the scheduled time slot. In the example of FIG. 22, this indication is 0, 1, 2 or 3. The scheduled time indication is then the cycle indication, left shifted by 5 bits ($\log_2$ 32) added to the scheduled time slot from the calendar. For example, if time slot 2202G, which is at time index 20 in the third calendar cycle (relative calendar indication 2), is the scheduled time slot, the scheduled time indication is 2×32+20=84. The scheduled time indication that is communicated to the requesting edge node is 84.

Figure 23:
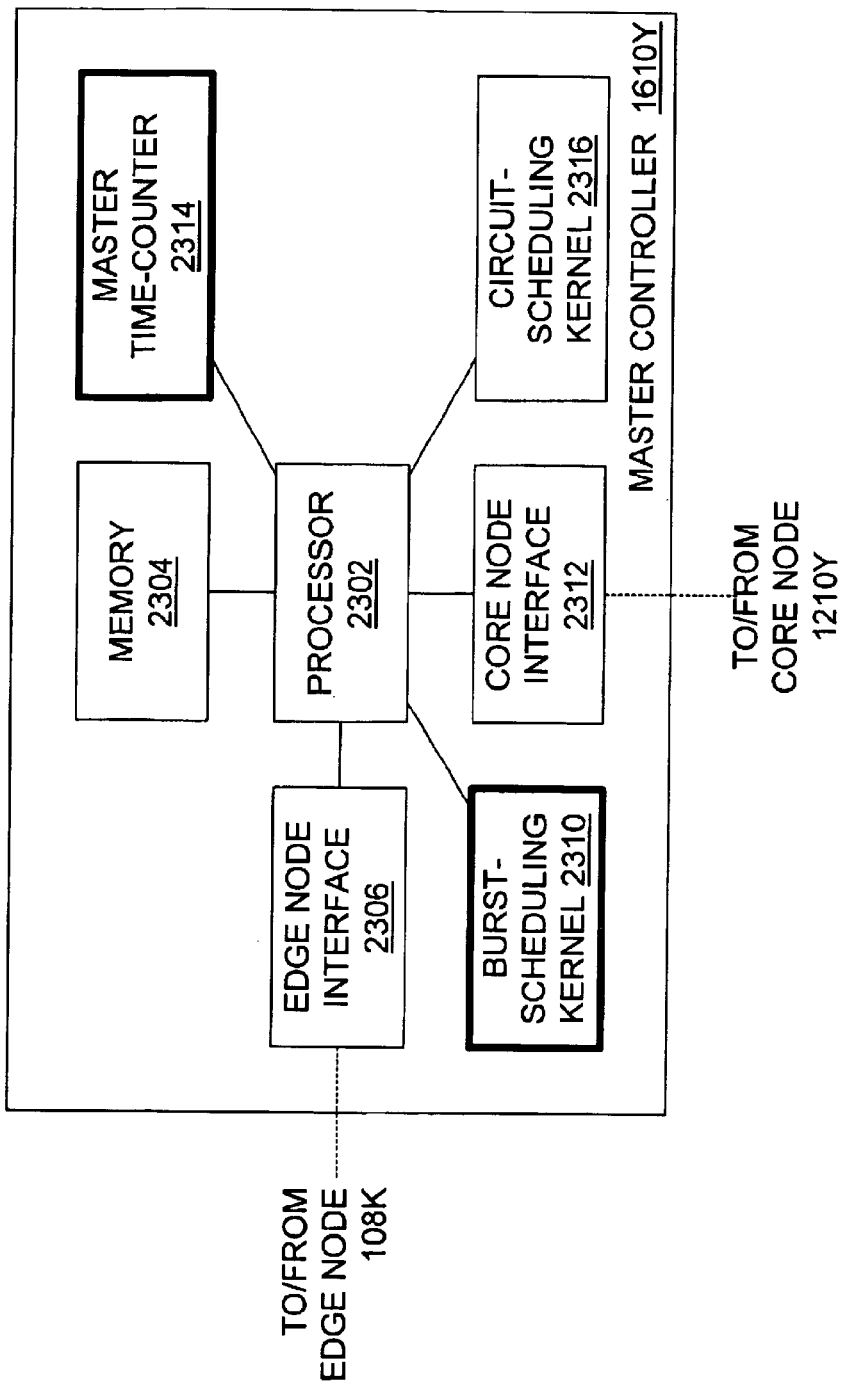
FIG. 23 illustrates a master controller including a burst scheduler and a circuit scheduler for use in the data network of FIG. 19.

A portion of the network capacity in the data network 1200 may be dedicated to relatively well-behaved traffic. That is, non-bursty traffic. To this end, a master controller may include a second scheduler dedicated to more traditional circuit switching. Like the master controller 1610Z illustrated in FIG. 17, the master controller 1610Y illustrated in FIG. 23 includes a processor 2302. The processor 2302 maintains connections to a memory 2304, an edge node interface 2306, a core node interface 2312 and a master time counter 2314. The master controller 1610Y illustrated in FIG. 23 also includes a circuit-scheduling kernel 2316 for scheduling transfers between edge nodes 108 on a longer term basis.

In one embodiment of the present invention, the edge nodes 108 (or the port controllers 206) may perform some processing of bursts. This processing may include expansion of bursts to have a length that is a discrete number of segments or aggregation of small bursts.

Notably, the present invention is applicable without dependence on whether switching in the data network 1200 is electrical or optical and without dependence on whether transmission in the data network 1200 is wireline or wireless. The optical switching example is particularly instructive, however, in that, given recent developments in Dense Wavelength Division Multiplexing, a link between an edge node 108 and a bufferless core node 1210 may include multiple (e.g., 32) channels. If the data network 1200 is to work as described in conjunction with FIG. 12, one of the multiple channels may be completely dedicated to the transfer of burst transfer requests. However, the transfer of burst transfer requests represent a very small percentage of the available capacity of such a channel and the unused capacity of the dedicated channel is wasted. This is why co-location of an edge node 108 with a bufferless core node 1210 is used. The optical example is also well suited to the consideration herein that the core node 1210X (FIG. 14) is bufferless, as an efficient method for buffering optically received data has not yet been devised.

Advantageously, the present invention allows bursts that switch through the core nodes to employ the core nodes, and associated space switches, nearly constantly, that is, with virtually no data loss. As such, the network resources are used more efficiently.

Other modifications will be apparent to those skilled in the art and, therefore, the invention is defined in the claims.

We claim:

1. A method of controlling a space switch having a plurality of input ports and a plurality of output ports, said method comprising:
    receiving a stream of burst transfer requests, each of said burst transfer requests specifying one of said input ports, one of said output parts, and a corresponding burst duration;
    grouping said burst transfer requests into burst groups according to their corresponding input ports;
    generating schedules for said burst transfer requests in an order in which input ports corresponding to said burst transfer requests become unoccupied;

transmitting said schedules to sources of said burst-transfer requests; and transmitting said schedules and corresponding burst-transfer requests to a slave controller for said space switch, to set up paths through said space switch.

2. The method of claim 1 wherein said generating comprises:

determining a next-available input port to be considered;

determining a next burst group corresponding to said next-available input port;

if said next burst group includes at least two burst transfer request:

determining a time gap as an availability time of an output port specified in each of said at least two burst transfer requests minus an availability time of said next available input port;

selecting a particular burst transfer request, from said at least two burst transfer requests, which corresponds to a lowest time gap;

if said next burst group includes one burst-transfer request:

identifying said one burst transfer request as a particular burst transfer request; and determining a starting time at which said space switch establishes a connection from said next-available input port to a particular output port specified in said particular burst-transfer request.

3. The method of claim 2 further comprising:

determining an updated availability time to equal said starting time plus a burst-duration time specified in said particular burst-transfer request;

updating said availability time of said next-available input port to equal said updated availability time; and updating an availability time of said particular output port to equal said updated availability time.

4. The method of claim 2 wherein, if said next burst group has no burst-transfer requests, updating said availability time of said next-available input port by adding a burst-duration of an artificial burst.

5. A space switch master controller for a space switch comprising:

a source interface for:

receiving a stream of burst transfer requests from a source node, each of said burst transfer requests including parameters specifying a requested connection and a duration for said requested connection;

transmitting scheduling information for each of said burst transfer requests to said source node;

a burst scheduler for generating, in an order in which input ports corresponding to said burst transfer requests become unoccupied, said scheduling information for each of said burst transfer requests in said stream based on said parameters; and a slave controller interface for transmitting instructions to a slave controller for said space switch, where said instruction are based on said scheduling information and cause said space switch to establish said requested connection.

6. A computer readable medium containing computer-executable instructions which, when performed by a processor in a space switch master controller for a space switch, cause the processor to:

receive a stream of burst transfer requests from a source node, each of said burst transfer requests including parameters specifying a requested connection and a duration for said requested connection;

generate, in an order in which input ports corresponding to said burst transfer requests become unoccupied, scheduling information for each of said burst transfer requests based on said parameters;

transmit said scheduling information to said source node; and transmit said scheduling information to a slave controller of said space switch.

7. A method of scheduling comprising:

determining a next-available input port among a plurality of input ports and an input time index at which said next-available input port will become available;

for each burst transfer request of a plurality of burst transfer requests received from said next-available input port, where said each burst transfer request includes a duration of a burst and a destination of said burst:

determining, from said destination of said burst, a corresponding output port among a plurality of output ports;

determining a time gap, where said time gap equals a time index as which said corresponding output port will become available minus said input time index;

selecting a particular burst transfer request from said plurality of burst transfer requests where said particular burst transfer request has a minimum time gap; and determining a scheduled time index, where said scheduled time index equals said time index at which said corresponding output port is available if said time gap is positive, otherwise said scheduled time index equals said input time index.

8. A method of generating scheduling information comprising:

determining a next-available input port among a plurality of input ports and a time index at which said next-available input port will become available by scanning a time calendar until an input port identifier is detected in a time slot, said calendar having a plurality of time slots, where each time slot corresponds to a predefined time interval;

for each burst transfer request of a plurality of burst transfer requests received in relation to said next-available input port, and where said each burst transfer request includes an identity of a burst and a destination for said burst:

determining from said destination for said burst, a corresponding output port among a plurality of output ports;

determining a time gap where said time gap is a difference between:

said time index at which said next-available input port will become available; and a time index at which said corresponding output will become available;

selecting one of said plurality of burst transfer requests as a selected burst transfer request, where said selected burst transfer request has a minimum time gap of said plurality of burst transfer request;

selecting a scheduled time index, where said scheduled time index is one of said time index at which said next available input port is available and said time index at which said corresponding output port is available; and transmitting scheduling information for a burst identified by said selected burst transfer request, said scheduling information based on said scheduling time index.

9. The method of claim 8 wherein said determining said time gap comprises reading said time index at which said corresponding output port is available from an element in an array, where said element is associated with said corresponding output port.

10. The method of claim 9 further comprising:
determining, from said selected burst transfer request, a transfer-time for said burst;
adding said transfer-time to said scheduled time index to result in a finishing time index; and
writing said input port identifier in a time slot corresponding to said finishing time index.

11. The method of claim 10 further comprising writing a null identifier in a time slot corresponding to said scheduled time index.

12. The method of claim 11 further comprising writing said finishing time index to said element in said array.

13. The method of claim 12 wherein said array is one of a plurality of arrays and said writing said finishing time index comprises writing said finishing time index to the element that is associated with said corresponding output port in each of said plurality of arrays.

14. The method of claim 13 wherein said writing in each of said plurality of arrays is performed in parallel.

15. The method of claim 12 wherein said time index at which said corresponding output port is available is selected as said scheduled time index.

16. The method of claim 12 wherein a calendar time slot index at which said input port identifier is detected is selected as said scheduled time index.

17. The method of claim 8 wherein said input port identifier is detected only if included in a predetermined group of input port identifiers.

18. The method of claim 17 wherein burst transfer requests are organized by groups of output ports and said determining said time gap is limited to include only those burst transfer requests corresponding to a group of said plurality of output ports.

19. A burst scheduler comprising a processor operable to:
determine a next-available input port among a plurality of input ports and an input time index at which said next-available input port becomes available;
for each burst transfer request of a plurality of burst transfer requests received from said next-available input port, and where said each burst transfer request includes a duration of a burst and a destination of said burst:
determine, from said destination of said burst, a corresponding output port among a plurality of output ports;
determine a time gap, where said time gap equals a time index at which said corresponding output port becomes available minus said input time index;
select a particular one of said plurality of burst transfer requests where said particular one of said plurality of burst transfer requests has a minimum time gap; and
determine a scheduled time index, where said scheduled time index equals said input time index when said time gap is negative and equals said time index at which said corresponding output port is available when said time gap is not negative.

20. A computer readable medium containing computer-executable instructions which, when performed by a processor in a burst scheduler, cause the processor to:
determine a next-available input port among a plurality of input ports and an input time index at which said next-available input port will become available;
for each burst transfer request of a plurality of bust transfer request received in from said next-available input port, and where said each burst transfer request includes a duration of a burst and a destination of said burst:
determine, from said destination of said burst, a corresponding output port among a plurality of output ports;
determine a time gap, where said time gap equals a time index at which said corresponding output port will become available minus said input time index;
select a particular one of said plurality of burst transfer requests where said particular one of said burst transfer requests has a minimum time gap; and
determine a scheduled time index, where said scheduled time index equals said time index at which said corresponding output port is available, if said time gap is positive, and equals said input time index if said time gap is not positive.

21. A data network comprising:
a plurality of edge nodes;
a plurality of core nodes, each core node of said plurality of core nodes including a space switch; and
a master controller for one said space switch in one said core node for:
receiving a stream of burst transfer requests from one of said plurality of edge nodes, each of said burst transfer requests including parameters specifying a requested connection and a duration for said requested connection;
generating, in an order in which input ports corresponding to said burst transfer requests become unoccupied, scheduling information for each of said burst transfer requests based on said parameters;
transmitting said scheduling information to said one of said plurality of edge nodes; and
transmitting said scheduling information to a slave controller of said one said space switch.

22. A master controller of a space switch, said space switch having a plurality of input ports and a plurality of output ports, said master controller operable to:
receive a stream of burst transfer requests, each of said burst transfer requests specifying one of said input ports, one of said output ports, and a corresponding burst duration;
group said burst transfer requests into burst groups, each of said burst groups corresponding to one of said input ports;
generate schedules for said burst transfer requests in an order in which input ports corresponding to said burst transfer requests become unoccupied;
transmit said schedules to sources of said burst-transfer; and
transmit said schedules and corresponding burst-transfer requests to a slave controller of said space switch to set up paths through said space switch.

23. A burst-switching network comprising:
a plurality of core nodes, each of said plurality of core nodes including a bufferless space switch; and
a plurality of edge nodes, each of said plurality of edge nodes having:
a communication link to each of at least one of said plurality of core nodes; and
a data buffer associated with said communications link;

where said each of said plurality of edge nodes is adapted to perform a process for time-locking to each of said at least one of said core nodes; and wherein said each of said plurality of edge nodes is adapted to:
- send a stream of burst-transfer requests to a selected core node of said at least one of said core nodes, where each burst-transfer request of said stream of burst-transfer requests corresponds to a burst having a duration below a specified limit;
- receive a stream of burst-transfer schedules from said selected core node; and
- transmit bursts corresponding to said burst-transfer requests to said selected core node according to said burst-transfer schedules wherein said burst-transfer schedules are based on a calendar having a predetermined calendar period, where said calendar has been divided into a predetermined number of divisions; and wherein each of said core nodes includes a master time counter having a predetermined counter period and each of said edges nodes includes a slave time counter having said predetermined counter period, and said process of time locking uses said slave time counter and said master timer counter.

24. The burst-switching network of claim 23 wherein said counter period exceeds a round-trip propagation delay between any of said edge nodes and any of said core nodes.

25. The burst-switching network of claim 23 wherein said counter period is an integer multiple of said calendar period.

26. The burst-switching network of claim 25 wherein said integer multiple equals a first power of two, and said predefined number of divisions equals a second power of two.

27. The burst-switching network of claim 23 wherein said calendar period is selected to at least equal said specified limit.

* * * * *

UNITED STATES PATENT AND TRADEMARK OFFICE
CERTIFICATE OF CORRECTION

PATENT NO. : 6,907,002 B2
DATED : June 14, 2005
INVENTOR(S) : Beshai et al.

It is certified that error appears in the above-identified patent and that said Letters Patent is hereby corrected as shown below:

Column 18,
Line 61, "output parts" should read -- output ports --.

Column 19,
Line 11, "burst transfer" should read -- burst-transfer --.
Line 16, "next available" should read -- next-available --.

Column 20,
Line 23, "time index as which" should read -- time index at which --.
Line 55, "corresponding output will" should read -- corresponding output port will --.
Line 62, "said next available" should read -- said next-available --.
Line 67, "said scheduling time index" should read -- said scheduled time index --.

Column 22,
Line 1, "plurality of burst transfer request received in from said next-available" should read -- plurality of burst transfer requests received in from said next-available --.

Signed and Sealed this

Twenty-first Day of February, 2006

JON W. DUDAS
*Director of the United States Patent and Trademark Office*